United States Patent
Wang et al.

(10) Patent No.: US 7,542,054 B2
(45) Date of Patent: Jun. 2, 2009

(54) APPARATUS AND METHOD FOR IMAGE QUALITY IMPROVEMENT WHILE SCALING AND SCROLLING THE IMAGE

(75) Inventors: Denzel Wang, Hsinchu (TW); Andy Chiu, Hsinchu (TW); Sheng-Che Tsao, Hsinchu (TW)

(73) Assignee: Via Technologies Inc., Taipei Hsien (TW)

( * ) Notice: Subject to any disclaimer, the term of this patent is extended or adjusted under 35 U.S.C. 154(b) by 481 days.

(21) Appl. No.: 11/345,285

(22) Filed: Feb. 2, 2006

(65) Prior Publication Data

US 2006/0176495 A1    Aug. 10, 2006

(30) Foreign Application Priority Data

Feb. 5, 2005    (TW) .............................. 94103852 A

(51) Int. Cl.
*G09G 5/00* (2006.01)
(52) U.S. Cl. ..................... 345/660; 345/667; 345/684
(58) Field of Classification Search ................ 345/660, 345/684, 688; 382/298
See application file for complete search history.

(56) References Cited

U.S. PATENT DOCUMENTS

| | | | | | |
|---|---|---|---|---|---|
| 5,208,872 | A | * | 5/1993 | Fisher | 382/300 |
| 5,434,591 | A | * | 7/1995 | Goto et al. | 345/688 |
| 5,634,021 | A | * | 5/1997 | Rosenberg et al. | 715/841 |
| 5,872,872 | A | * | 2/1999 | Kajiwara | 382/296 |
| 6,035,073 | A | * | 3/2000 | Kaup | 382/276 |
| 6,993,174 | B2 | * | 1/2006 | Fan et al. | 382/131 |

FOREIGN PATENT DOCUMENTS

JP    2002-286467 A    10/2002

* cited by examiner

*Primary Examiner*—M Good Johnson
(74) *Attorney, Agent, or Firm*—Birch, Stewart, Kolasch & Birch, LLP

(57) ABSTRACT

An image data processing apparatus for detecting a scrolling direction of a first image thereto scaling the first image simultaneously is disclosed. The image data processing apparatus includes an image detecting module and a scaling module. The image detecting module is used for extracting an eigenvalue of the first image and its scrolling detection thereto outputs a directional signal and a line difference signal. The scaling module receives a ratio signal, the directional signal, and the line difference signal thereto outputs a second image accordingly.

17 Claims, 24 Drawing Sheets

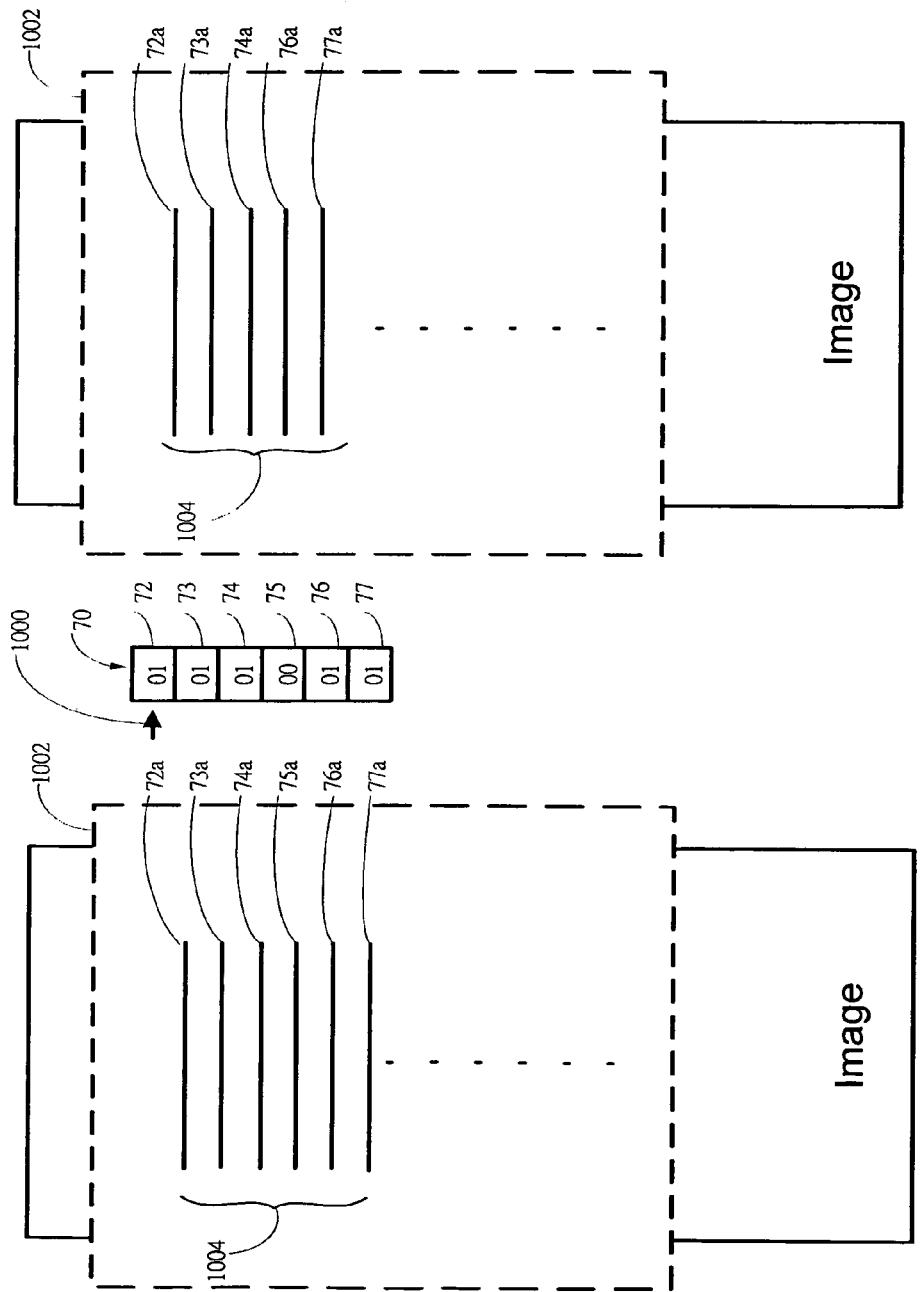

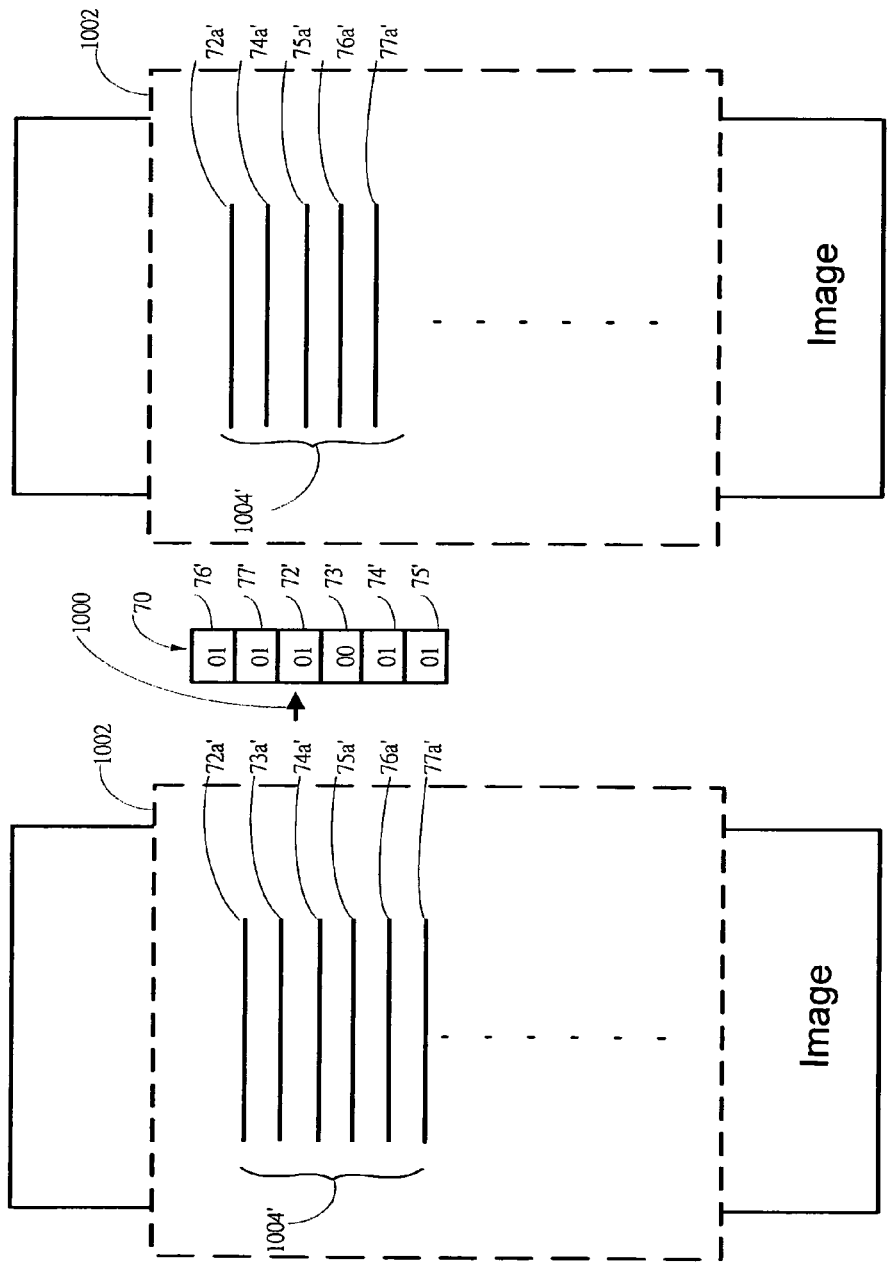

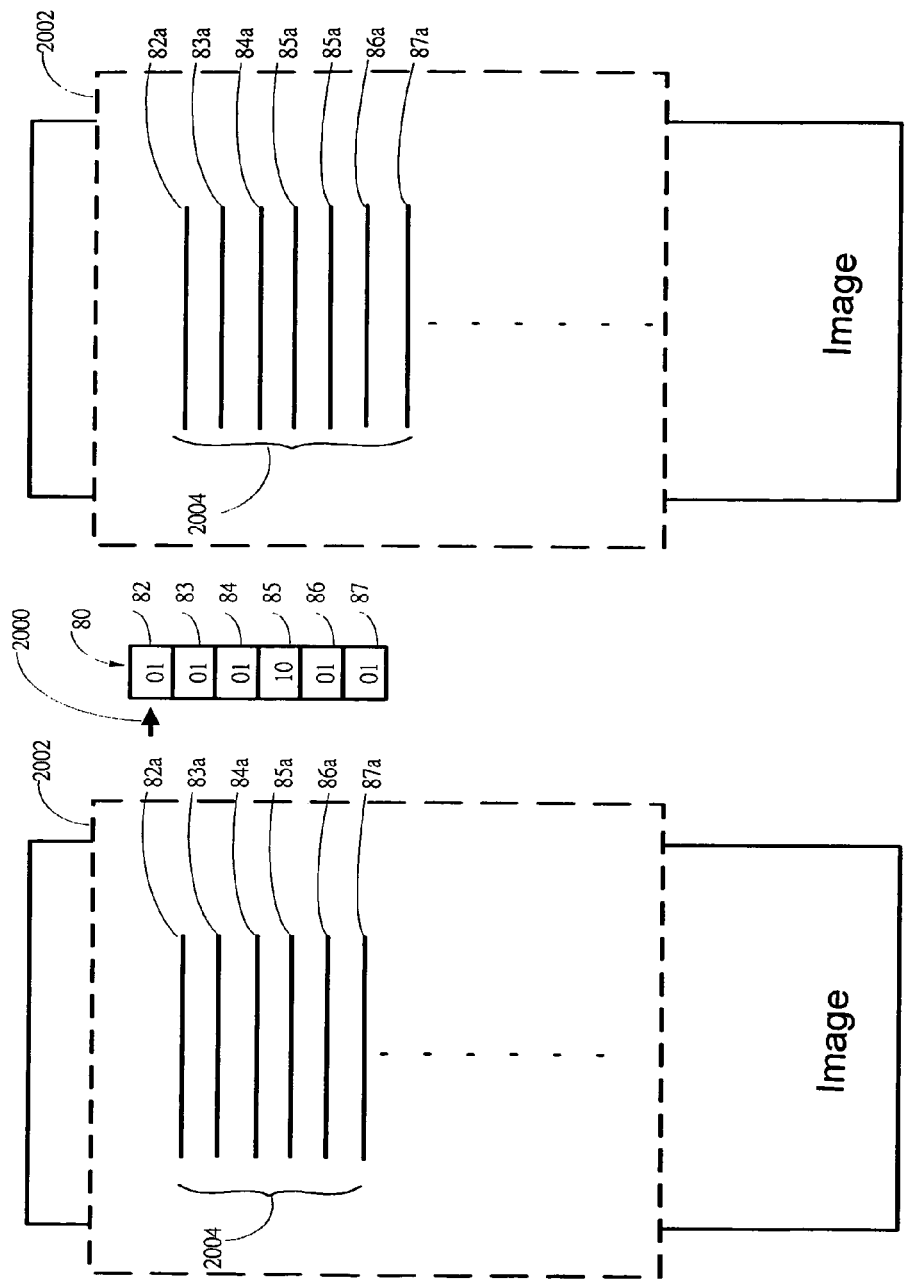

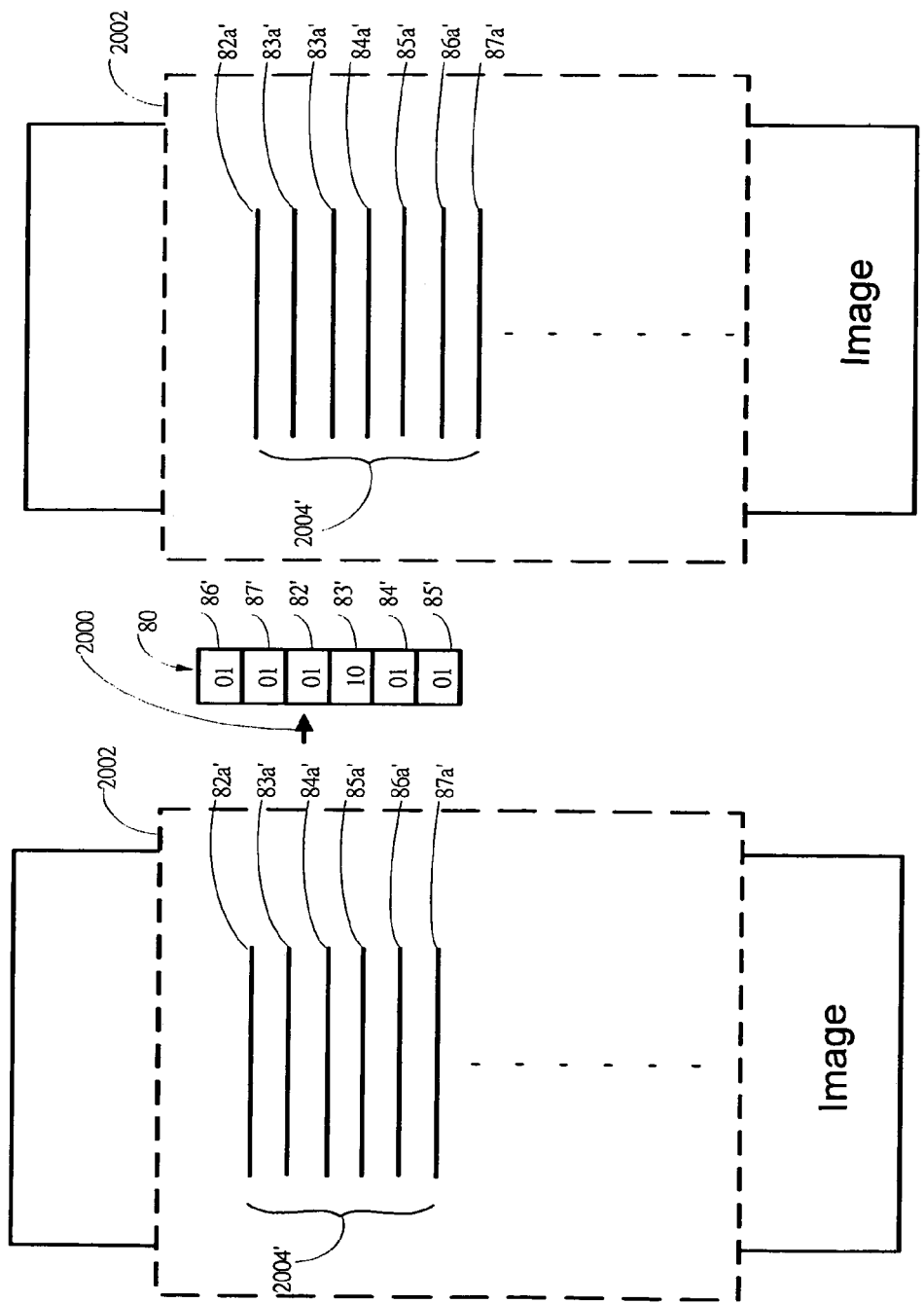

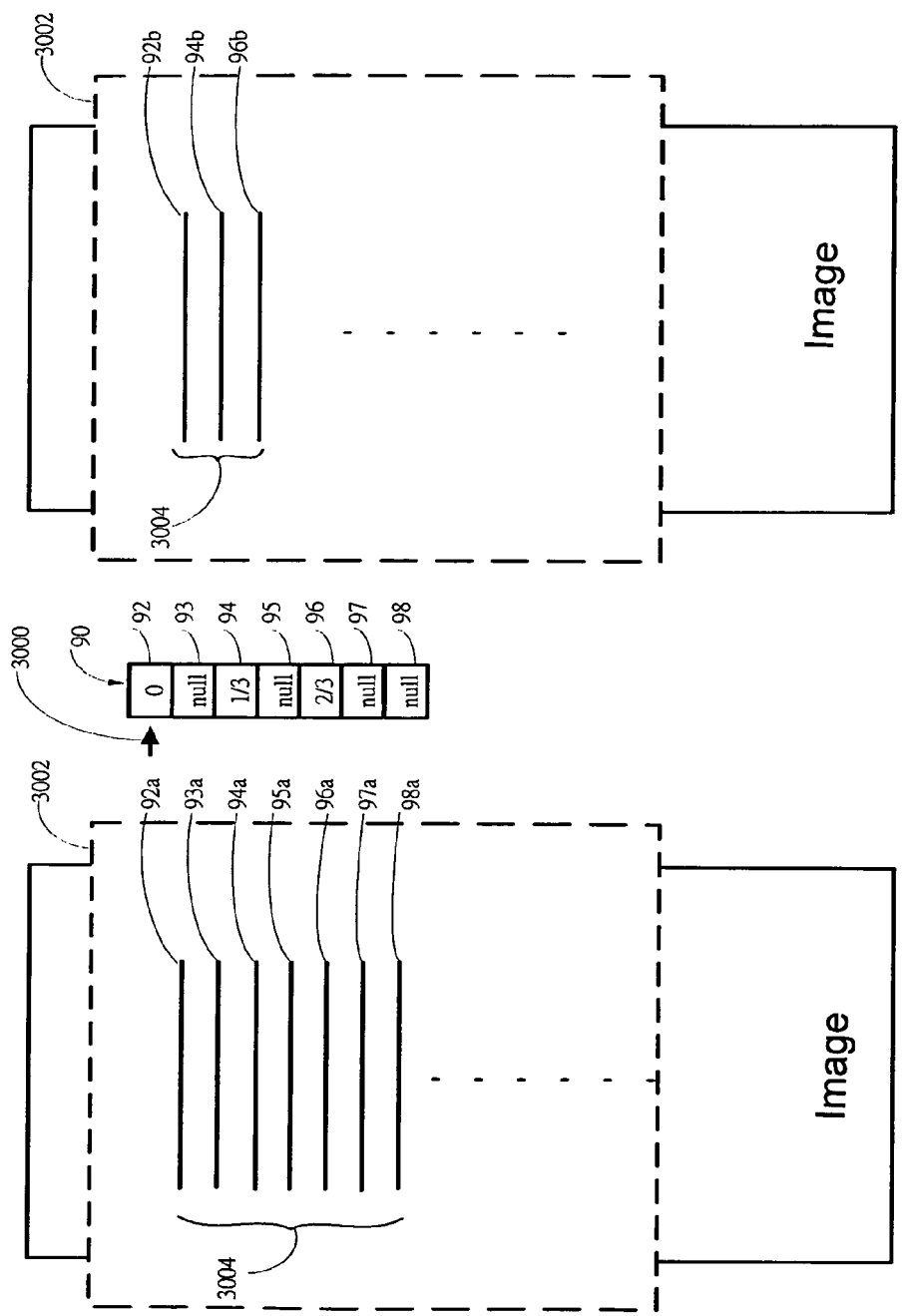

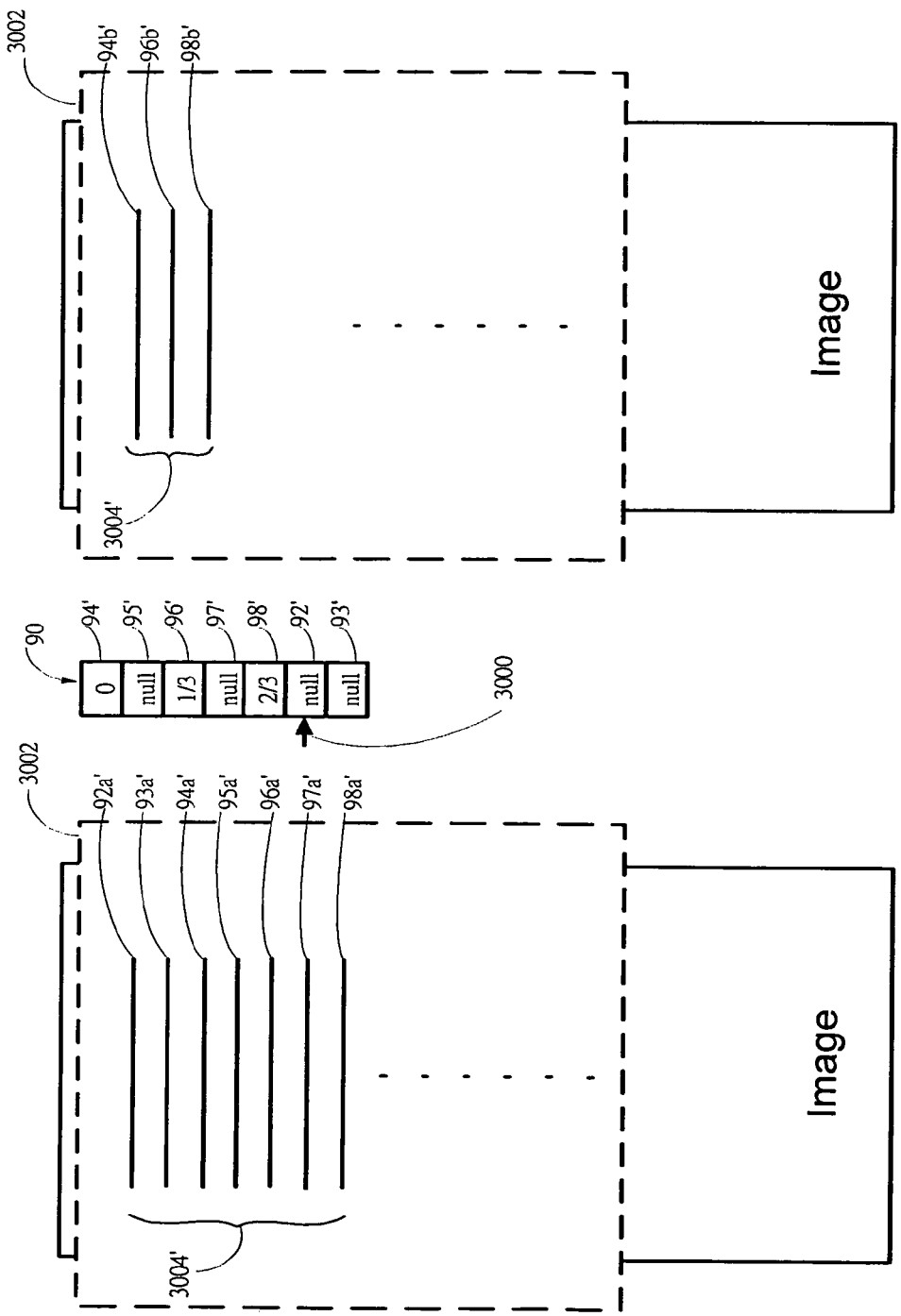

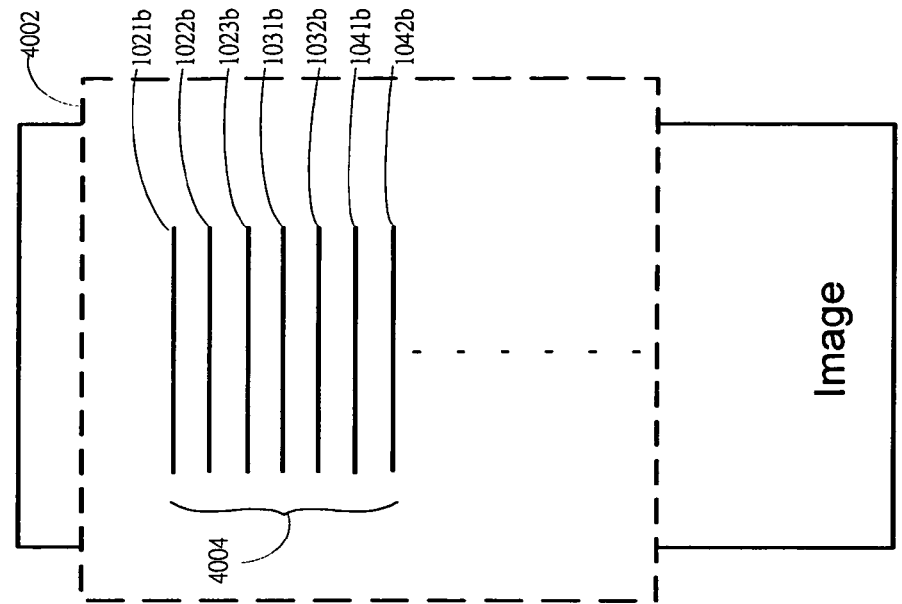
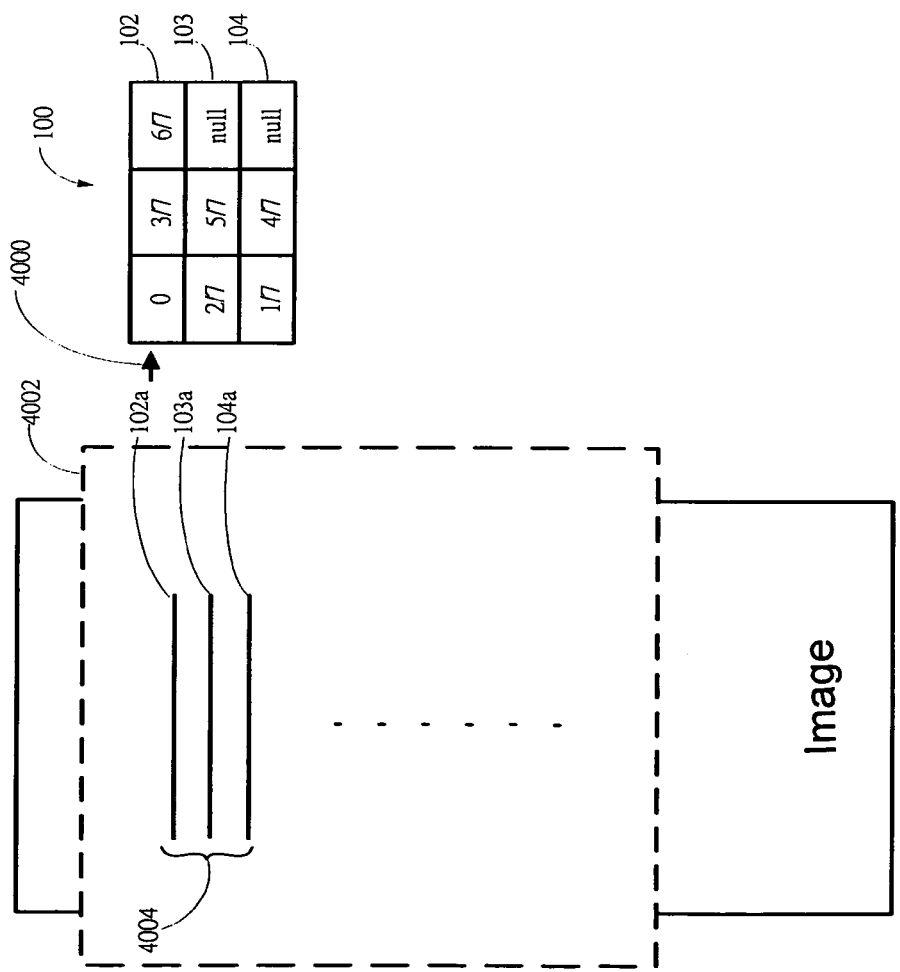
FIG.16 (b)
FIG.16 (a)

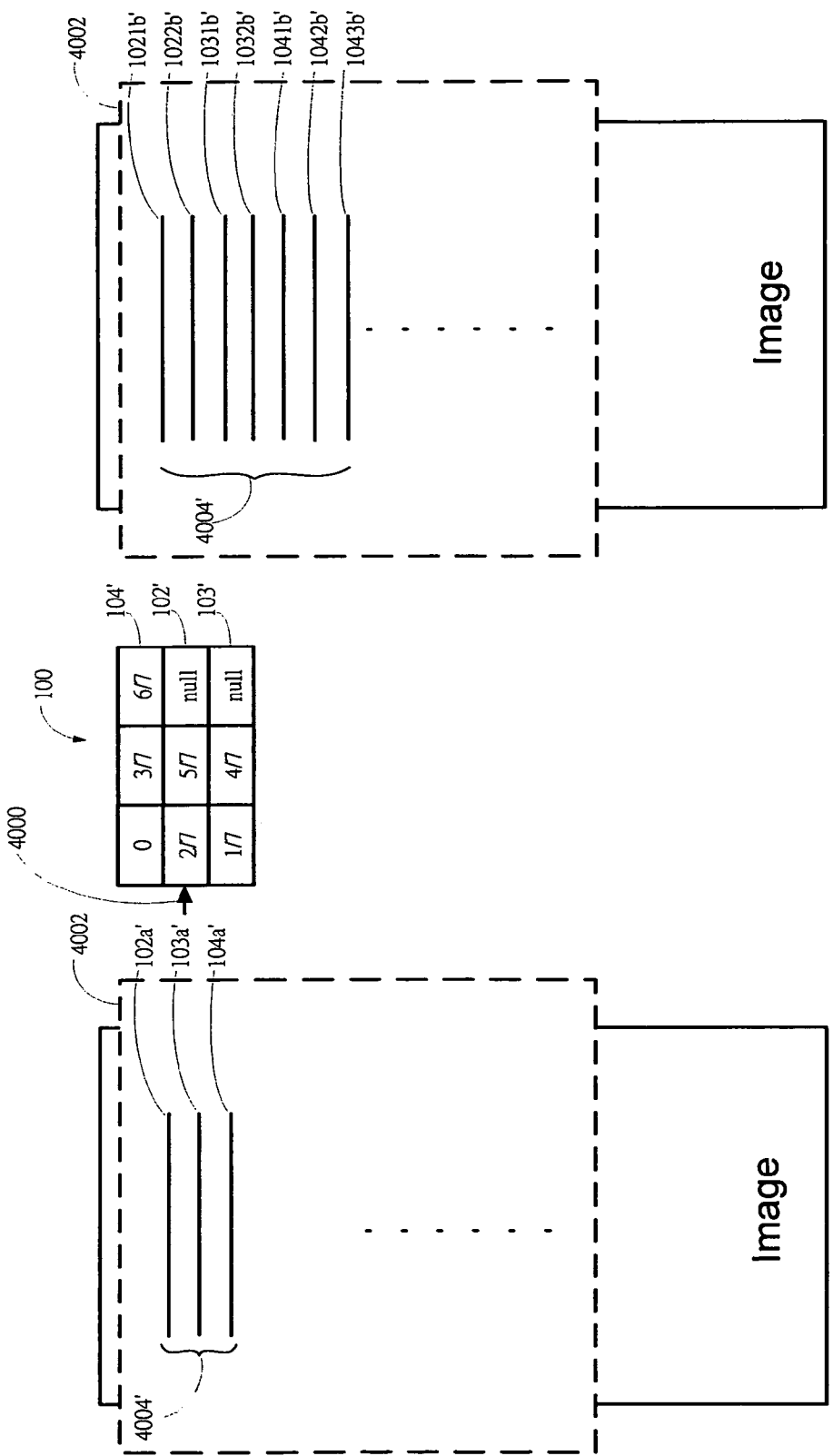

APPARATUS AND METHOD FOR IMAGE QUALITY IMPROVEMENT WHILE SCALING AND SCROLLING THE IMAGE

FIELD OF THE INVENTION

The invention relates to an image data processing and apparatus, particularly to the apparatus and method by which digital image scrolling can be detected and the digital image can be scaled up or scaled down according to the scrolling direction.

DESCRIPTION OF THE PRIOR ART

To enlarge or shrinkage an digital image (hereinafter called image), in conventional image process, it is found to be implemented by means of fixed point deleting, copy or interpolating method. However, if the image presentation on the display is scrolling and the image process is still conducted by the fixed point process, then it would cause the user have the eyesore and/or visual ability decay problems due to stare the screen but with a flicking image.

In using computer, scrolling the screen up or down is frequently used. On the other hand, to approach the effect of screen scrolling, it is not necessary to move the picture but by moving a visual field down which is corresponded to the display range so that it is as if the picture is scrolling up while viewing by the observer, as is seen in FIG. 1. On the other hand, if it is desired to scaling the image down while the screen is scrolling, then the general step is set the fixed point deleting by referring to a look up table. As is shown in FIG. 2(a), while a ratio signal (not shown) is 5/6, a look-up table 20 includes subfields 32, 34, 36, 38, 40, and 42. In subfields, the content "01" represents unchanged and "00" represents delete. The visual field 22 includes many fields and one of the fields 24 has six sub-segments 32a, 34a, 36a, 38a, 40a, and 42a, respectively, corresponding to the 32, 34, 36, 38, 40, and 42 in the look-up table 20. The sub-segments 32a, 34a, 36a, 38a, 40a, and 42a are a set for forming pixels along a horizontal direction. Consequently, for the field 24 in the visual field 22 is concerned, the sub-segment 38a is deleted and the succeeded sub-segments are replaced while performing scaling image down, the result is shown in FIG. 2(b). Similarly, the other sub-segments in every segment in the visual field, the criterion for scaling image down is also based on the look-up table 20.

If it is desired to enlarge the picture while it is scrolling, a further step is to add some points in the visual field in accordance with the look-up table. Referring to FIG. 3, if a received ratio signal is 7/6, subfields 52, 54, 56, 58, 60, and 62 in the look-up table are generated. In the look-up table 50, the contents "01" in the subfields represents unchanged and "10" represents enlarge by twice. The visual field 84 includes many segments and one of the segments 66 has six sub-segments 52a, 54a, 56a, 58a, 60a, and 62a; respectively, corresponding to the subfields 52, 54, 56, 58, 60 and 62 in the look-up table. The sub-segments 52a, 54a, 56a, 58a, 60a, and 62a are a set for forming pixels along a horizontal direction. Consequently, for the field 66 in the visual field 64 is concerned, the sub-segment 58a is copied one time and the succeeded sub-segments are followed while performing scaling image up, the result is shown in FIG. 3(b). Similarly, the other sub-segments in every segment in the visual field, the criterion for scaling image up also based on this look-up table 50.

In other words, to scaling up or down a scrolling image by conventional method is to generate a look-up table according to the received ratio signal and then dividing the visual field into a plurality of segments. In each segment, the sub-s their contents then base on the look-up table to perform sub-segment deleting or adding corresponded. The sub-segment deleting or adding is by a way of fixed points and the way does not change even the visual field is moving.

As aforementioned description, the sub-segment deleting or adding by a way of fixed point, will cause the image being flicking while scrolling the screen.

SUMMARY OF THE INVENTION

An image data processing apparatus for detecting a scrolling direction of a first image thereto scales the first image simultaneously is disclosed. The image data processing apparatus includes an image detecting module and a scaling module. The image detecting module is used for extracting an eigenvalue of the first image and its scrolling detection thereto outputs a directional signal and a line difference signal. The scaling module receives a ratio signal, the directional signal, and the line difference signal thereto outputs a second image accordingly.

A method of image data processing is also disclosed. The method includes following steps of extracting an eigenvalue of the first image and its scrolling detection thereto outputs a directional signal and a line difference signal; receiving a ratio signal, generating a look-up table according the ratio signal received; outputting a second image according to the first image, the directional signal, the line difference signal and the look-up table.

Preferably, the look-up table generated based on the ratio signal having a starting reference point. The starting reference point varies with the time when the image is scrolling. The directional signal, and the line difference signal will change the starting reference point so that the image quality is significantly improve during image scaling and scrolling.

The advantages and features of the present invention will be better understood with the aid of the following detailed descriptions and illustrative figures.

DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIGS. 8(*a*)-8(*d*) are schematic diagrams illustrating a series processes of scaling an image down in accordance with a preferred embodiment of the present invention.

FIGS. 10(*a*)-10(*d*) are schematic diagrams illustrating a series of processes of scaling an image up in accordance with a preferred embodiment of the present invention.

FIGS. 14(*a*)-14(*d*) are schematic diagrams illustrating a series of processes of scaling an image down in accordance with another preferred embodiment of the present invention.

FIGS. 16(*a*-16(*d*) are schematic diagrams illustrating a series of processes of scaling an image up in accordance with another preferred embodiment of the present invention.

DESCRIPTION OF PREFERRED EMBODIMENTS

The present invention is to provide an image data processing apparatus. By detecting the scrolling direction scaled image up or down. The image data processing apparatus includes an image detecting module, and a scaling module. The image detecting module extracting an eigenvalue of the first image and the scrolling direction thereof along. Thereafter a directional signal and a row difference signal are outputted. The scaling module then scaling the first image according to the directional signal, the row difference signal, and the received ratio signal to output a second image.

Figure 1:
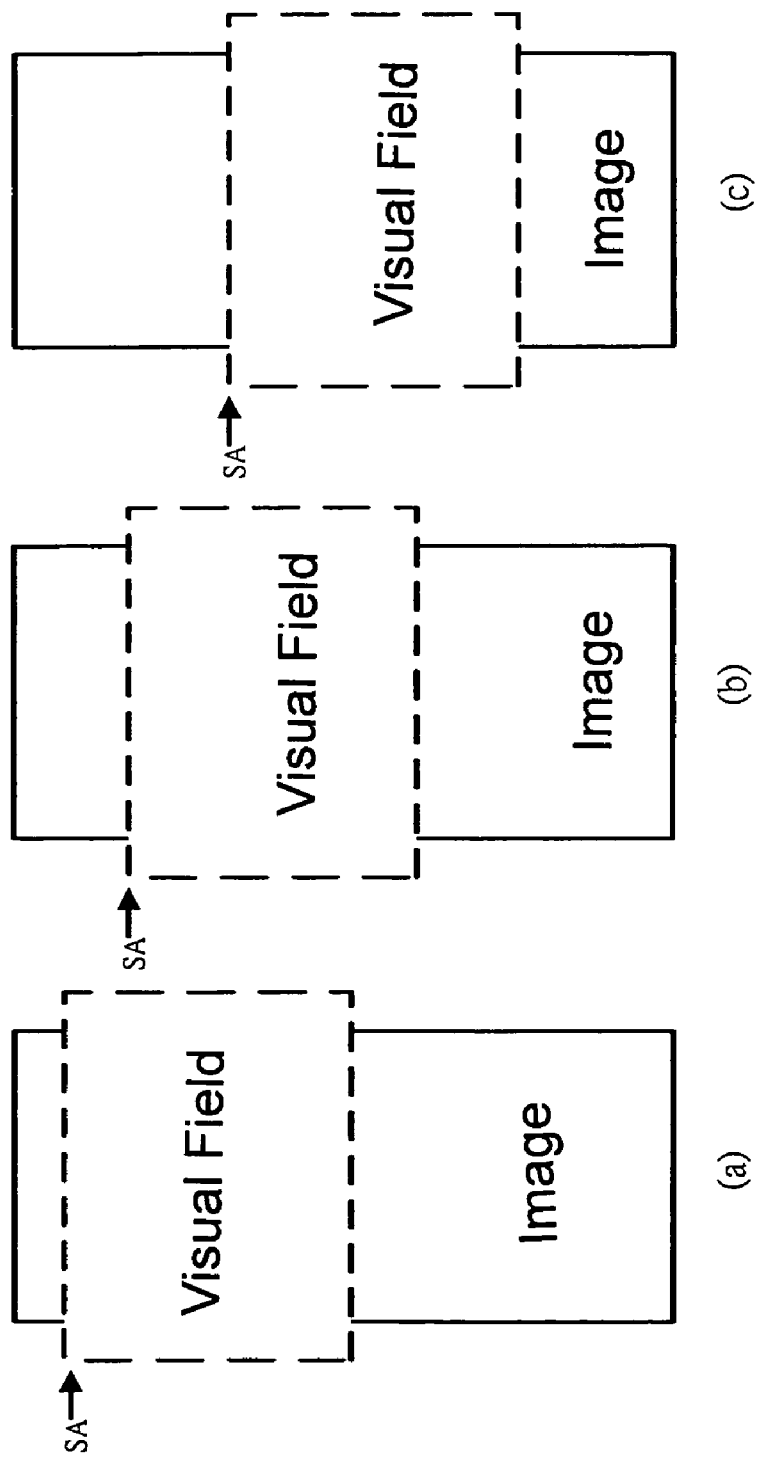
FIGS. 1(a)-(c) are a series of schematic diagrams showing a screen scrolling in accordance with the prior art.
Figure 2:
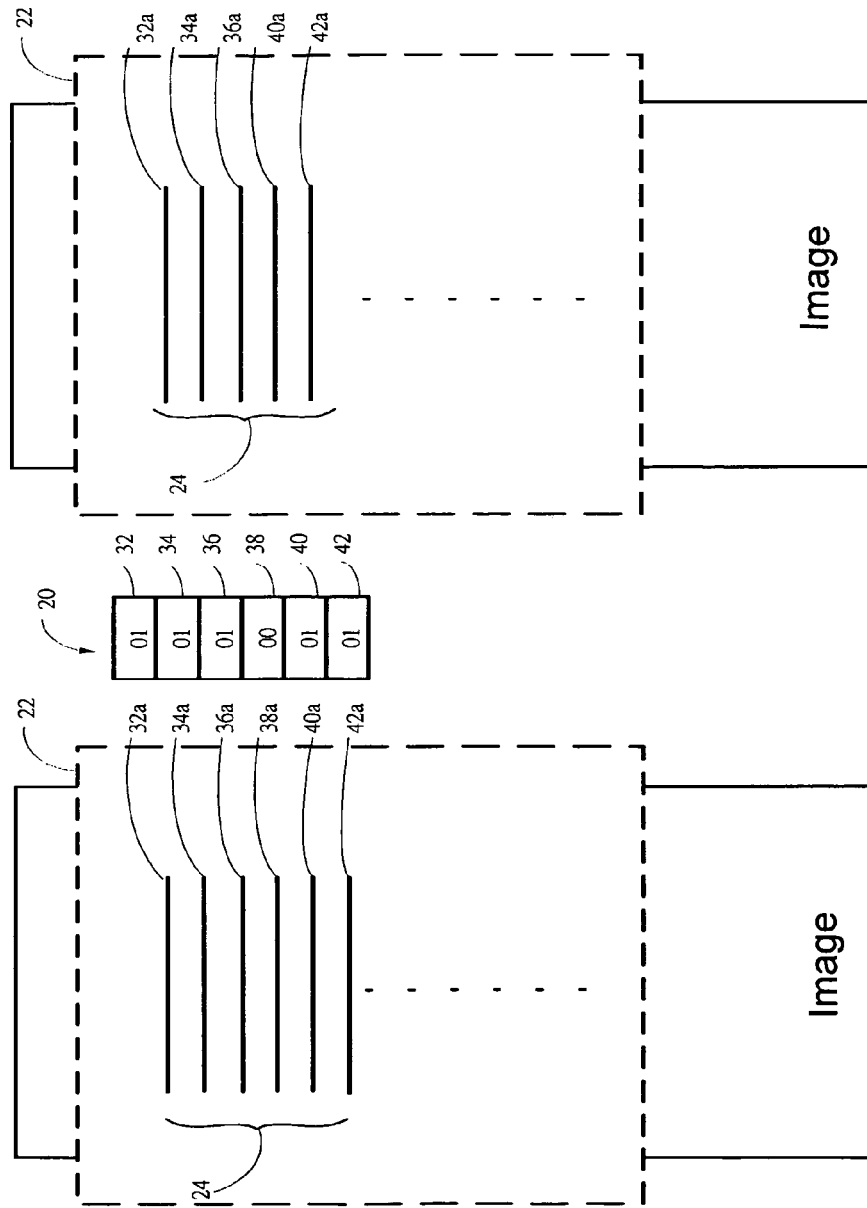
FIGS. 2(a)-2(b) are a series of schematic diagrams showing an image being scrolled and scaled down simultaneously in accordance with the prior art.
Figure 3:
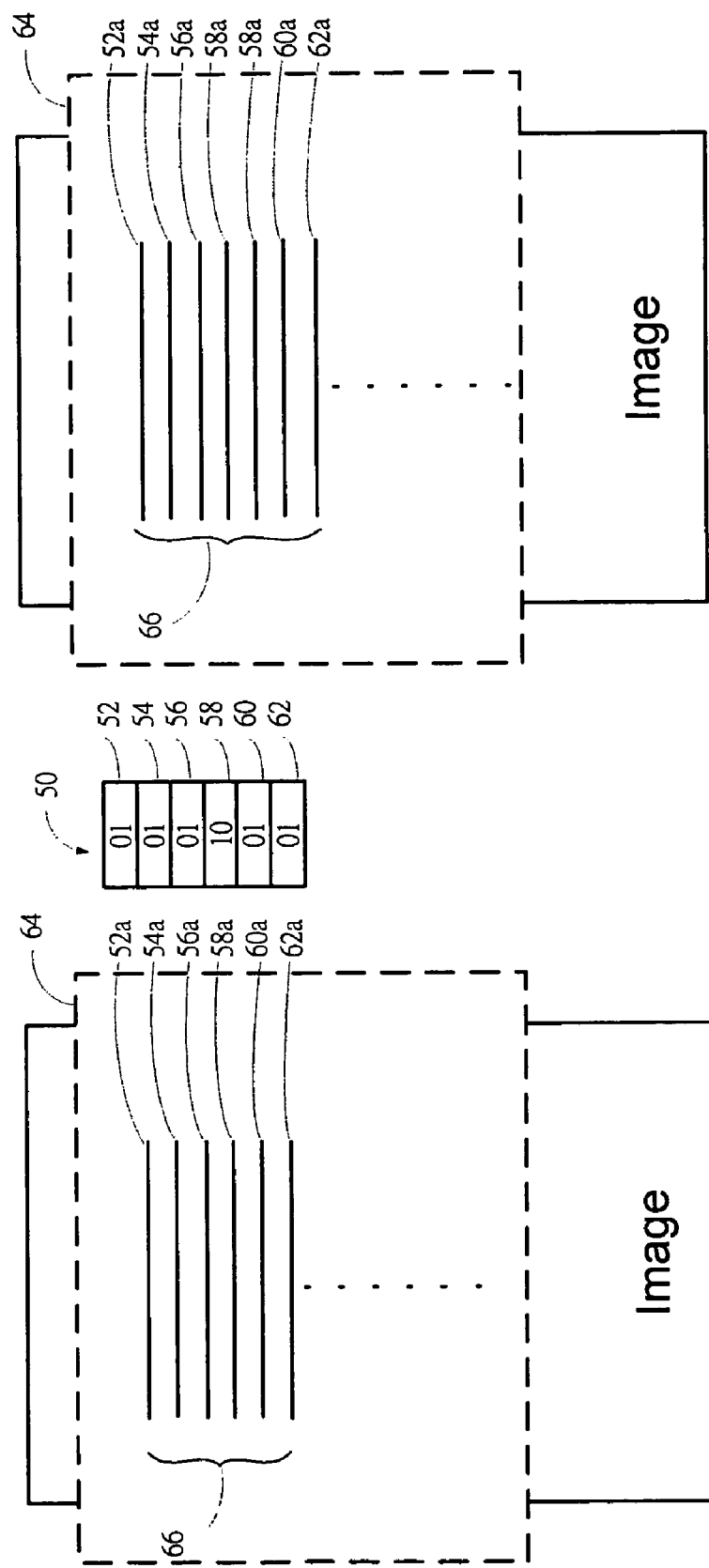
FIGS. 3(a)-3(b) are a series of schematic diagram showing an image being scrolled and scaled up simultaneously in accordance with the prior art.
Figure 4:
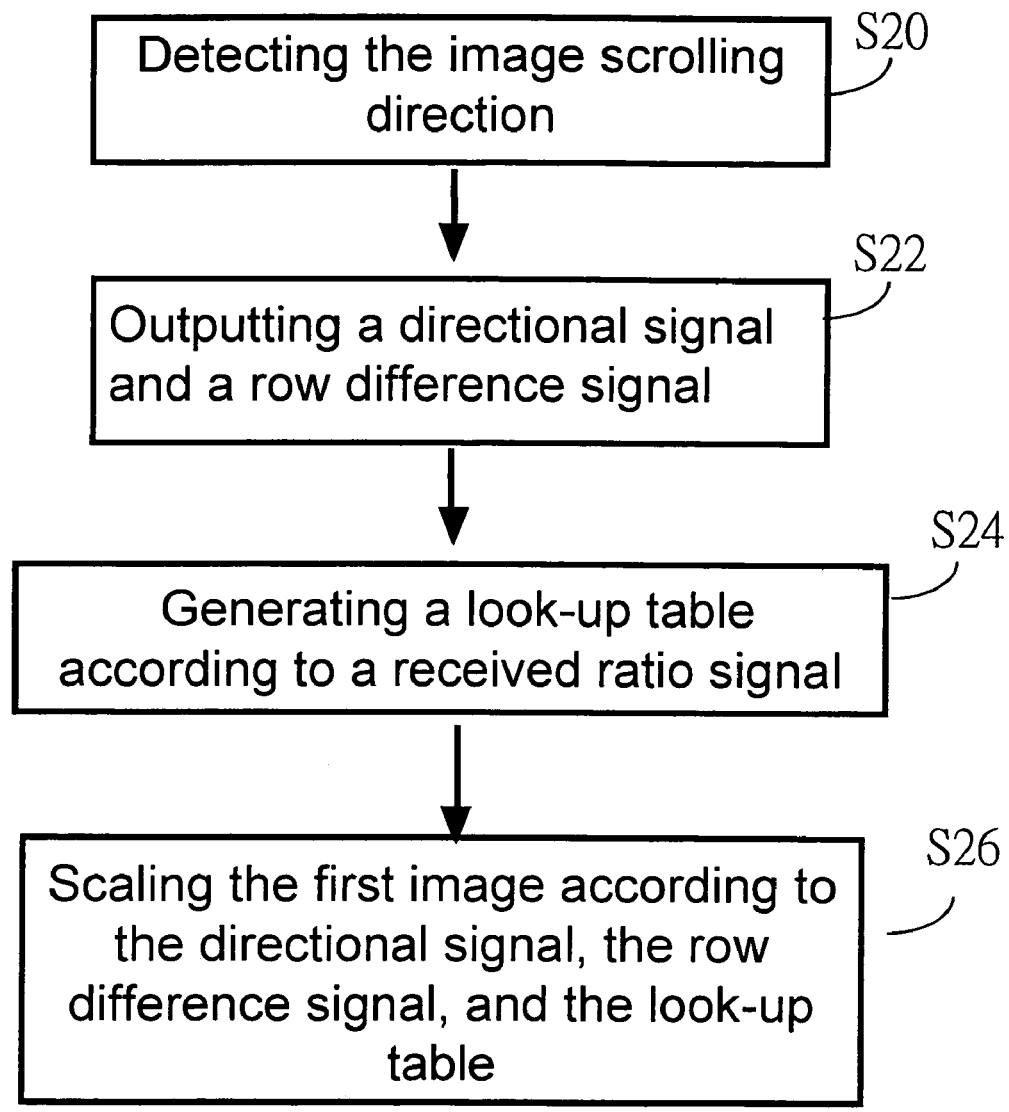
FIG. 4 is a flow chart illustrating a method for improving image quality while scaling and scrolling the image in accordance with the present invention.

Please refer to FIG. 4, which provides a flow chart for the purpose of improving the picture quality while scrolling the screen. The steps are as follows:

Step S20: detecting the image scrolling direction;
Step S22: outputting a directional signal and a moving downward or upward distance (hereinafter called row difference) signal;
Step S24: generating a look-up table in accordance with a received ratio signal; and
Step S26: scaling the first image according to the directional signal, the row difference signal, and the look-up table.

Figure 5:
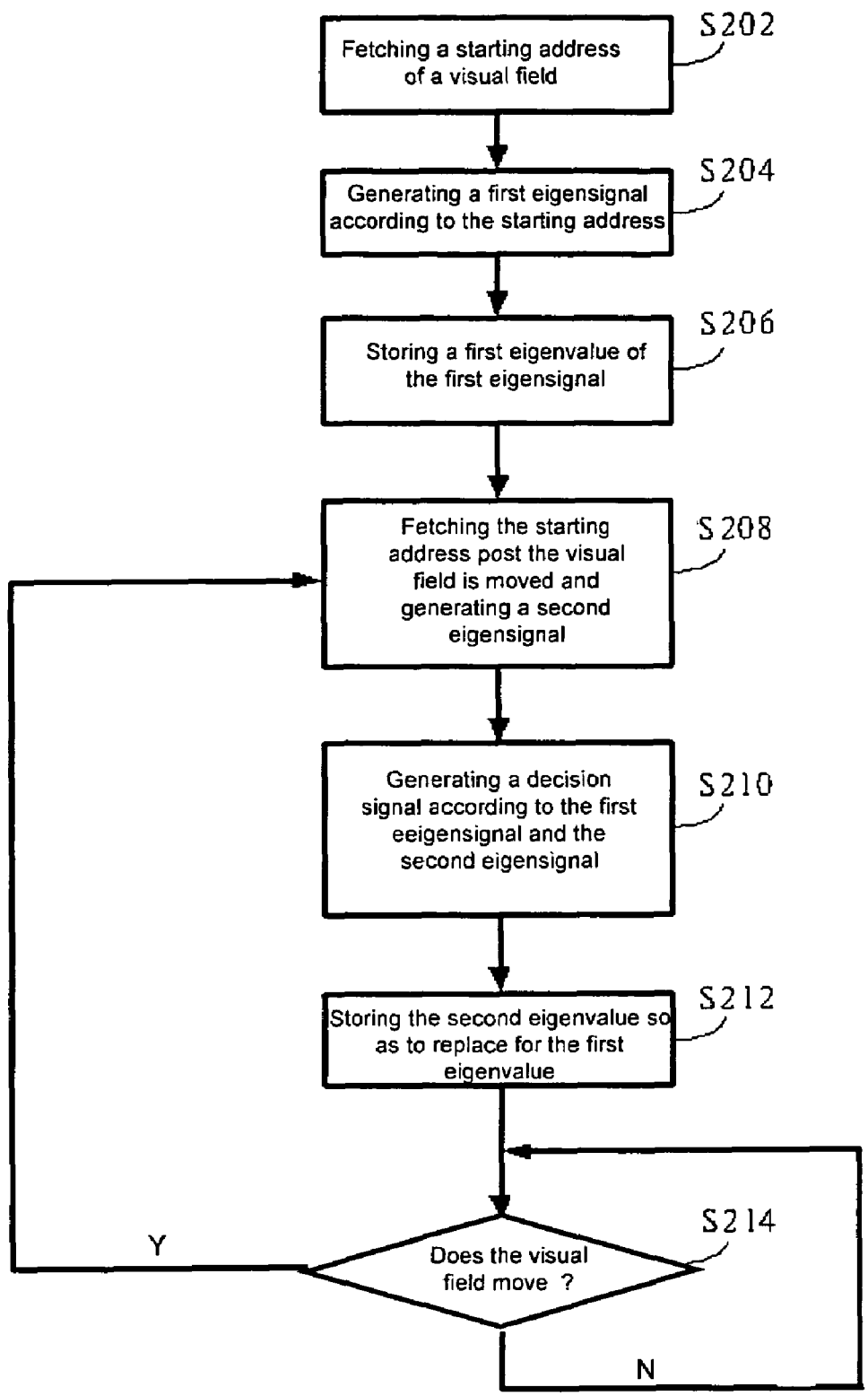
FIG. 5 is a flow chart illustrating image detecting in accordance with the present invention.

The step S20 is composed a plurality of steps, as is shown in FIG. 5. In FIG. 5, it shows a flow chart of about detecting the image scrolling direction.

Step S202: fetching a starting address of a visual field;
Step S204: generating a first eigensignal according to the starting address;
Step S206: storing a first eigenvalue of the first eigensignal;
Step S208 fetching the starting address post the visual field is moved and generating a second eigensignal;
Step S210: generating a decision signal according to the first eigensignal and the second eigensignal;
Step S212: substituting the second eigenvalue for the first eigenvalue; and
Step S214: waiting for the visual field moving. If the visual field is moved, the step S214 then goes to step S208, otherwise, the step S214 is hold.

Figure 6:
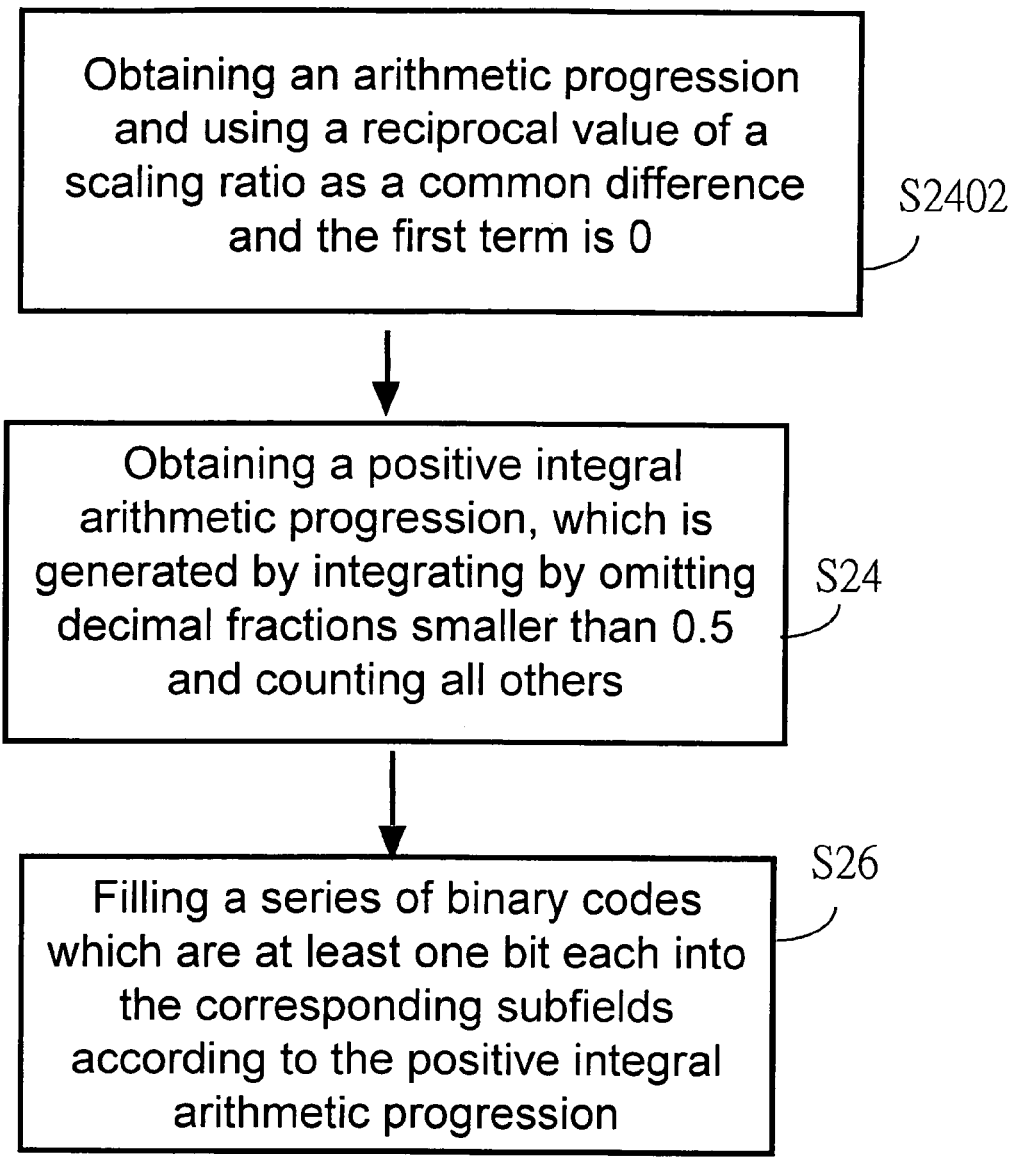
FIG. 6 is a flow chart illustrating a look-up table generating processes based on a ratio signal in accordance with a preferred embodiment of the present invention.

The step S24 is composed a plurality of steps, as is shown in FIG. 6. In FIG. 6, it shows a flow chart of about generating a look-up table in accordance with the received ratio signal. The steps are include:

S2402: obtaining an arithmetic progression. The common difference is the reciprocal value of a scaling ratio and the first term is 0.

S2404: obtaining a positive integral arithmetic progression, which is generated by integrating by omitting decimal fractions smaller than 0.5 and counting all others, including 0,5, as 1;

S2406: filling a series of binary codes which are at least one bit each into the corresponding subfields according to the positive integral arithmetic progression.

The forgoing positive integral arithmetic progression generating step S2404 of is an exemplary only but not intended to limit the claim scope. For example, each term in the positive integral arithmetic progression may also be generated by unconditional round off the decimal fraction or taking its Gauss arithmetic of each terms of the original the arithmetic progression.

Figure 7:
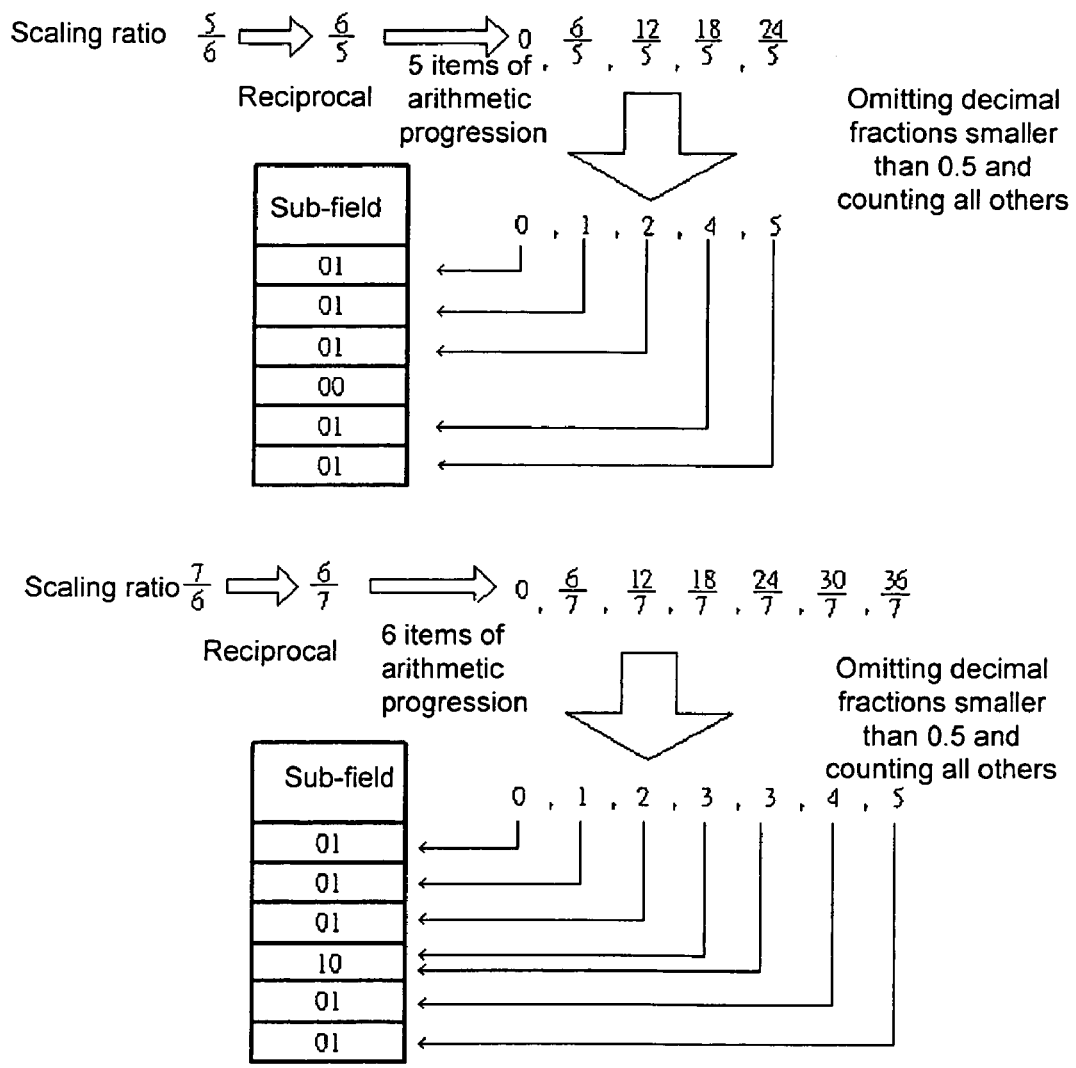
FIG. 7 is a schematic diagram illustrating a look-up table generating processes based on a ratio signal according to a preferred embodiment of the present invention.

FIG. 7 is shown a look-up table according to a received scaling ratio signal of a preferred embodiment of the present invention. Assuming the scaling ratio is identified to be 5/6, the reciprocal of 5/6 is 6/5, which is served as an arithmetic difference and accordingly five terms of 0, 1×6/5, 2×6/5, 3×6/5, 4×6/5 are generated. According a rule of the present invention, the total terms are 5 due to denominator "5." Thus, the terms of resulted arithmetic progression will be 0, 6/5, 12/5, 18/5, and 24/5. After omitting decimal fractions smaller than 0.5 and counting all others, including 0.5, as 1, the terms of the positive arithmetic progression are 0, 1, 2, 4, and 5. Then a look-up table which have field number corresponding to the digit and each field is filled in a binary code according to how many times the digit is presented is generated. Accordingly, the $0^{th}$ field to $4^{th}$ field are, respectively, 01, 01, 01, 00, 01, and 01.

Another example is by taking the ratio signal 7/6. The total terms is 7, and the results of the arithmetic progression are 0, 6/7, 12/7, 18/7, 24/7, 30/7 and 36/7. After omitting decimal fractions smaller than 0.5 and counting all others, including 0.5, as 1, the terms of the positive arithmetic progression are 0, 1, 2, 3, 3, 4, and 5. Then a look-up table which have field number corresponding to the digit and each field is filled in a binary code according to how many times the digit is presented is generated. Accordingly, the $0^{th}$ field to $6^{th}$ field are: 01, 01, 01, 10, 01, 01, and 01, as is shown in FIG. 7(*b*).

Please refer to FIG. 8, which illustrates an image is scrolling and to be scaled down in accordance with an embodiment of the present invention. In FIG. 8(*a*), the look-up table 70 is generated based on the scaling ratio 5/6 of a received ratio signal. The visual field 1002 having a staring reference coordinate 1000 and a segment 1004 in the visual field 1002 includes sub-segments 72a, 73a, 74a, 75a, 76a, and 77a corresponding to subfields 72, 73, 74, 75, 76, and 77 in the look-up table 70, which have contents, respectively, 01, 01, 01, 00, 01, and 01. The segment 1004 in the scaled image is shown in FIG. 8(b). Surely, the scaled image contains many fields and each is implemented according to the others fields of the look-up table.

At the next time, the image detecting module will detect scrolling direction, e.g., the moving direction of the visual field and figure out a row difference. For instance, the image detecting module detected out the image is upward i.e., the visual field downward by two rows, therefore, the starting reference coordinate 1000 of the look-up table 70 is downward by two units, as shown in FIG. 8(C). At the same time, the segment 1004' has sub-segments 72a', 73a', 74a', 75a', 76a', and 77a', corresponding to the subfields 72', 73', 74', 75', 76', and 77' in the look-up table. After scaled the image down, the result segment 1004 is shown in the FIG. 8(d). Viewing from visual field is concerned, the deleted sub-segment 75a in the previous state shown in FIG. 8(a) and the deleted sub-segment 73a' in the next state shown in FIG. 8(c) are located at the same sub-segment. Changing the position of the starting reference coordinate 1000 will make the deleted sub-segments of both states become the same. As a result, the viewer will not find out the difference between two states.

Figure 9:
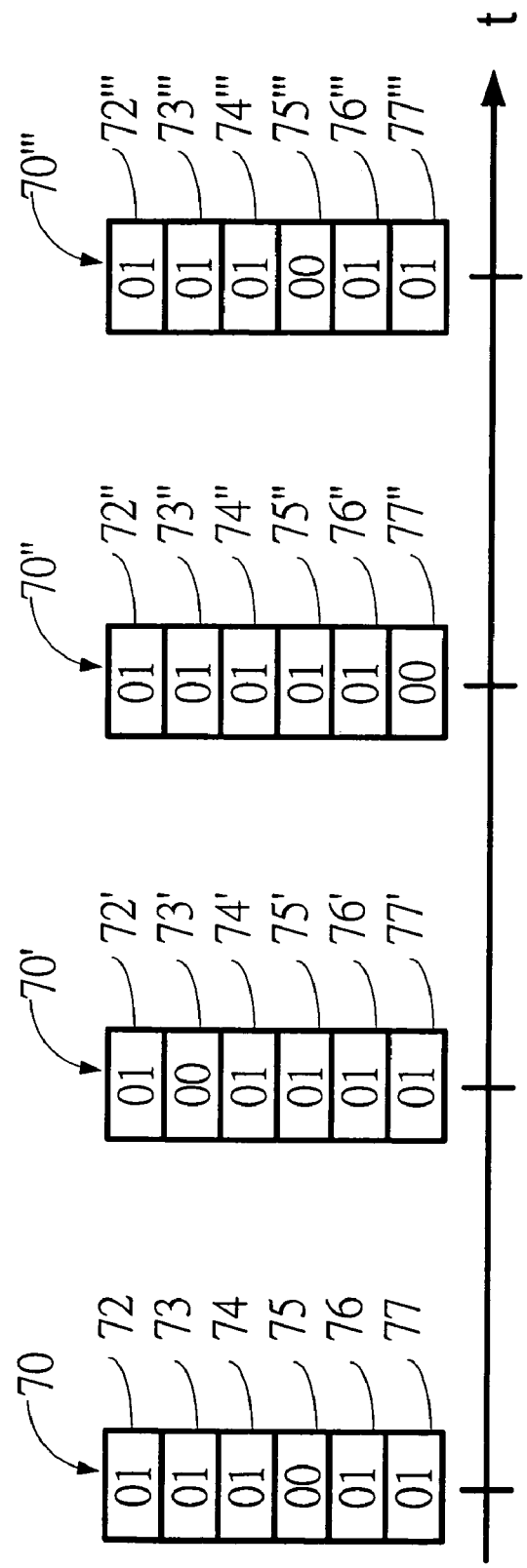
FIG. 9 is a series of schematic diagrams illustrating a look-up table varied with time in accordance with FIG. 8(*a*) to 8(*d*) of a preferred embodiment of the present invention.

In other words, the look-up table 70 is varied with time. Return to above example, the image detecting module detected out the image is upward scrolling i.e., the visual field downward scrolling by two rows. FIG. 9 shows the look-up tables 70, 70' which are, respectively, corresponding to FIG. 8(a) (before the screen is scrolled) and FIG. 8(c) (after the screen is scrolled). In FIG. 9, the look-up tables 70", 70'" which are, respectively, corresponding to FIG. 8(b) (after the image is scaled down but before the screen scrolled) and FIG. 8(d) (after the image is scaled down and the screen is scrolled.)

Please refer to FIG. 10, which illustrates an image is scrolling and to be scaled up in accordance with another embodiment of the present invention. In FIG. 10(a), the look-up table 80 is generated based on the scaling ratio 7/6 of a received ratio signal. The visual field 2002 having a staring reference coordinate 2000 and a segment 2004 in the visual field 2002 includes sub-segments 82a, 83a, 84a, 85a, 86a, and 87a corresponding to subfields 82, 83, 84, 85, 86, and 87 in the look-up table 80, which have contents, respectively, 01, 01, 01, 10, 01, and 01. The segment 2004 in the scaled image is shown in FIG. 10(b). Surely, the scaled image contains many fields and each is implemented according to the others fields of the look-up table.

At the next time, the image detecting module detects scrolling direction, e.g., the moving direction of the visual field and figure out a row difference. For instance, the image detecting module detected out the image is upward i.e., the visual field 2002 downward by two rows, therefore, the starting reference coordinate 1000 of the look-up table 80 is downward by two units, as shown in FIG. 10(C). At the same time, the segment 2004' has sub-segments 82a', 83a', 84a', 85a', 86a', and 87a', corresponding to the subfields 82', 83', 84', 85', 86', and 87' in the look-up table. After scaled the image up, the result segment 2004 is shown in the FIG. 10(d). Viewing from visual field is concerned, the copied sub-segment 85a in the previous state shown in FIG. 10(a) and the copied sub-segment 83a' in the next state shown in FIG. 10(c) are located at the same sub-segment. Changing the position of the starting reference coordinate 2000 will make the copied sub-segments of both states become the same. As a result, the viewer will not find out the difference between two states.

Figure 11:
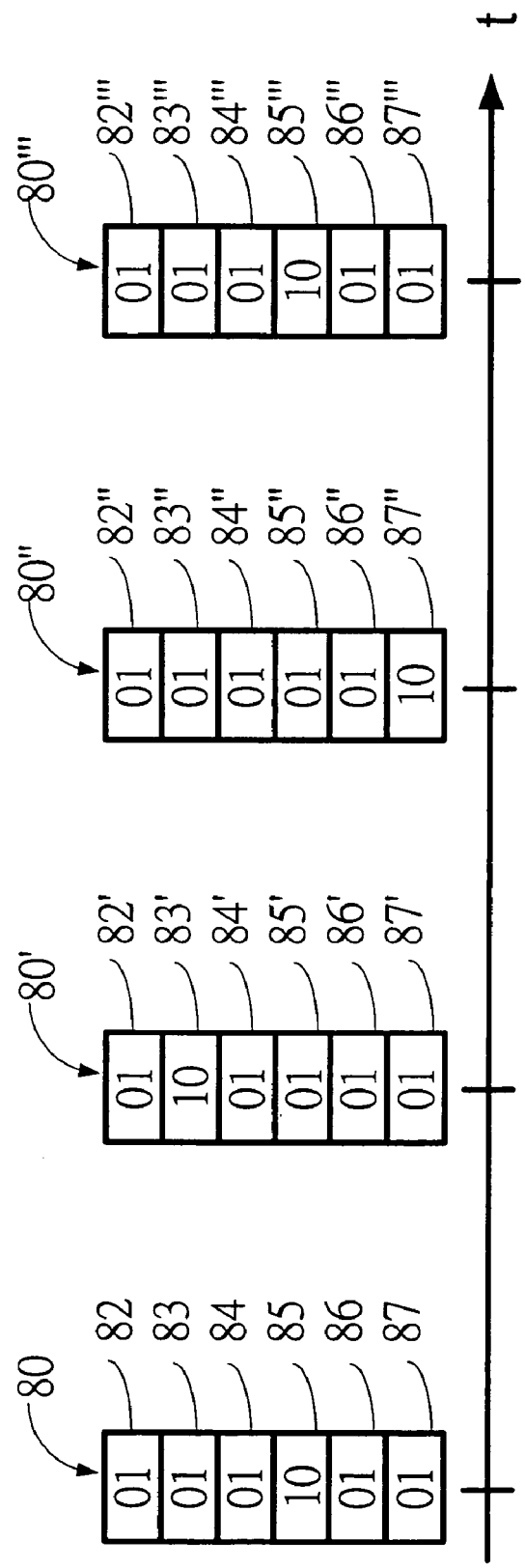
FIG. 11 is a series schematic diagrams illustrating a look-up table 80 varied with the time in accordance with FIG. 10(*a*) to 10(*d*) of a preferred embodiment of the present invention.

In other words, the look-up table 80 is varied with time. Return to above example, the image detecting module detected out the image is upward scrolling i.e., the visual field downward scrolling by two rows. FIG. 11 shows the look-up tables 80, 80', which are, respectively, corresponding to FIG. 10(a) (before the screen is scrolled) and FIG. 10(c) (after the screen is scrolled). In FIG. 11, the look-up tables 80", 80",' which are, respectively, corresponding to FIG. 10(b) (after enlarging the image but before scrolling the screen) and FIG. 10(d) (after enlarging the image and scrolling the screen).

Figure 12:
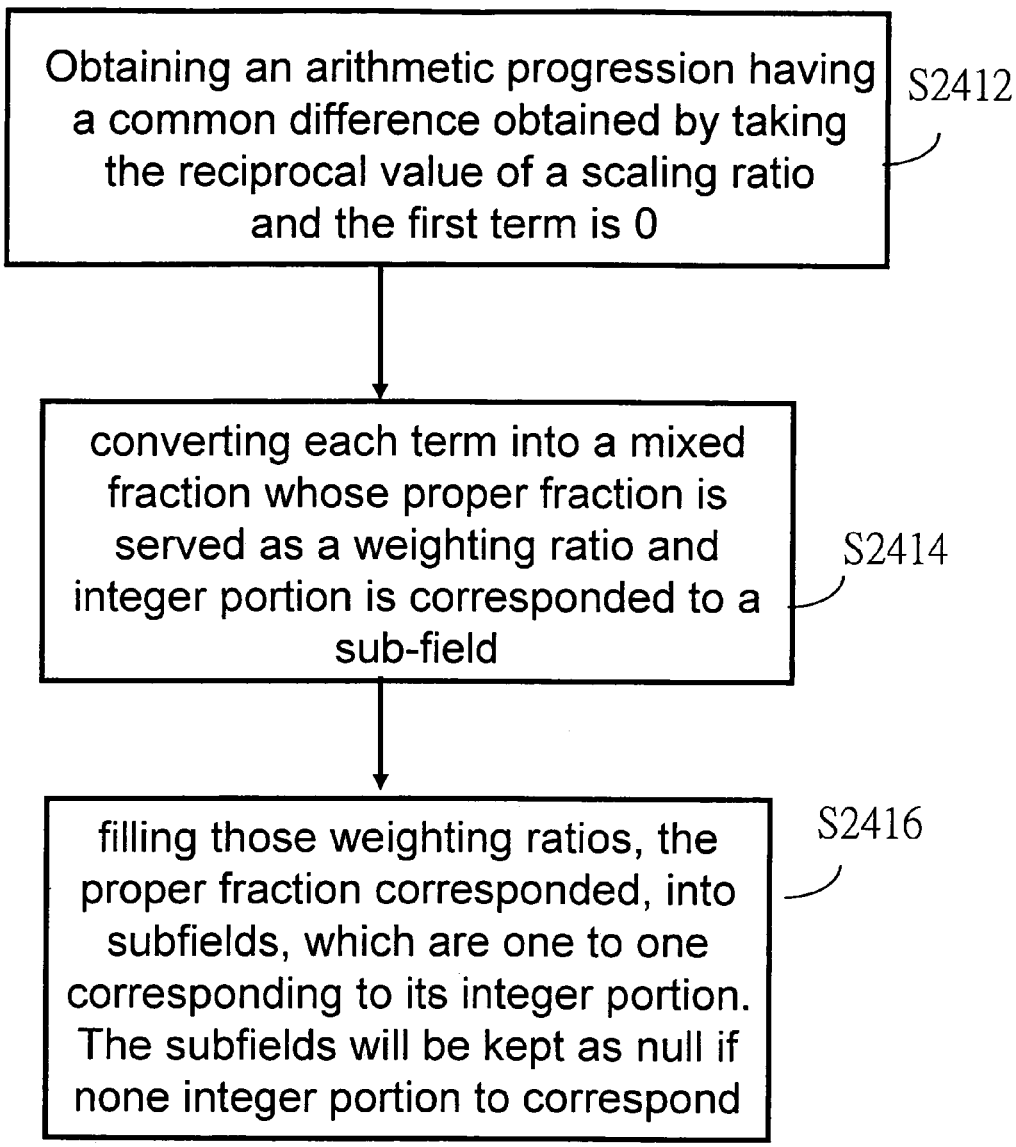
FIG. 12 is a flow chart illustrating a look-up table generating processes based on a ratio signal in accordance with another preferred embodiment of the present invention.

According to anther embodiment of the present invention, the step S24 shown in FIG. 4, is composed a plurality of steps. Please refer to FIG. 12, In FIG. 12, it shows a flow chart of generating a look-up table in accordance with the received ratio signal. The steps are:

S2412: obtaining an arithmetic progression, which has a common difference obtained by taking the reciprocal value of a scaling ratio and the first term is 0;

S2414: converting each term into a mixed fraction whose proper fraction is served as a weighting ratio and integer portion thereof is corresponded to a sub-field;

S2416: filling those weighting ratios, the proper fraction corresponded, into subfields, which are one to one corresponding to its integer portion. The subfields will be kept as null if none integer portion is corresponded.

Figure 13:
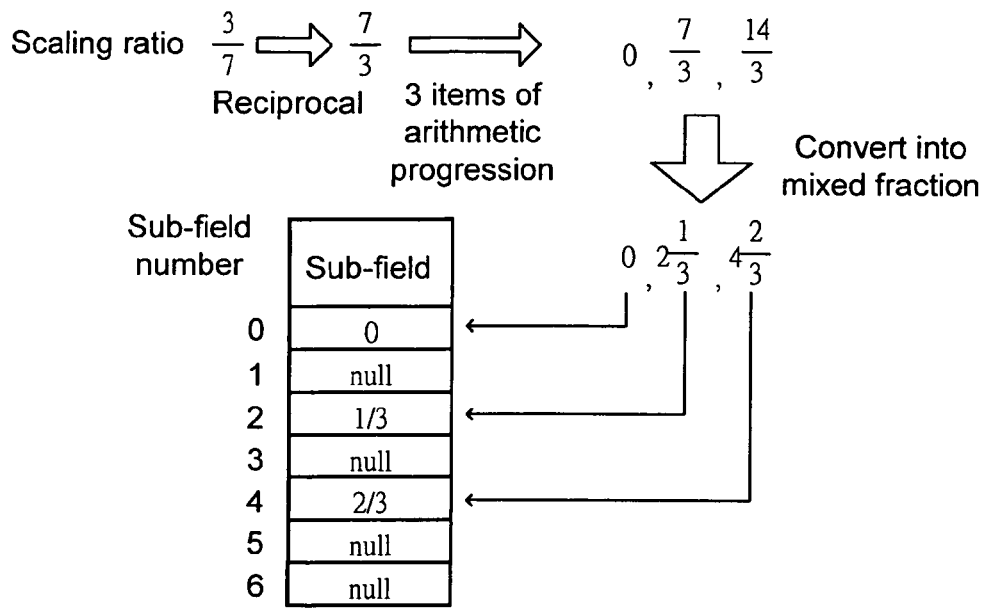
FIGS. 13(*a*) and (*b*) are schematic diagrams illustrating a look-up table generating processes based on a ratio signal in accordance with another preferred embodiment of the present invention.
Figure 13:
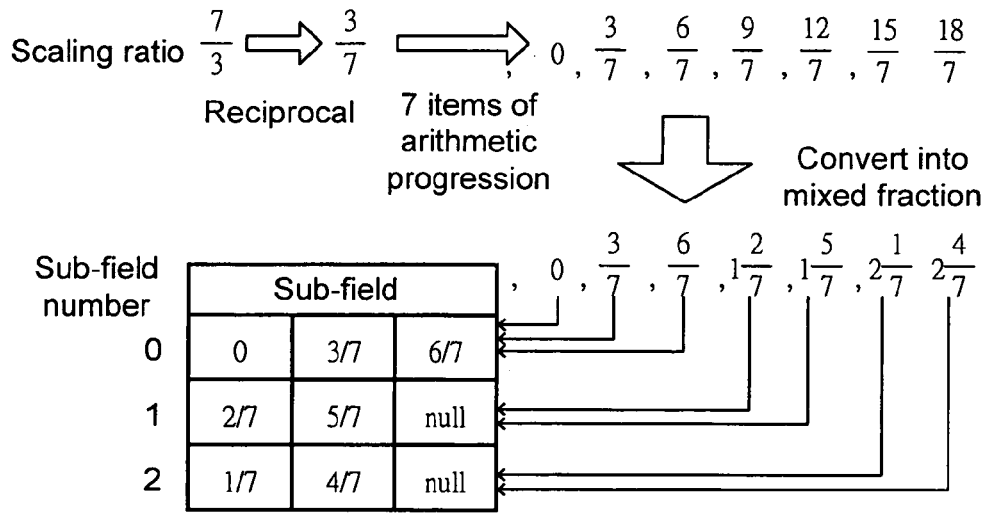

According to a preferred embodiment of the present invention, a received scaling ratio signal 3/7 is taken as an example. A series of processes for generating a look-up table are shown in FIG. 13. Assuming the scaling ratio is identified to be 3/7, the reciprocal of 3/7 is 7/3, which is served as a common difference. Accordingly, three terms, 0, 7/3, and 14/3 are generated.

Converting them into mixed fractions, the results are: 0

$$2\frac{1}{3},$$

and $$4\frac{2}{3}.$$

According the rule, the integer portions 0, 2, and 4 will correspond to the 0th, 2nd, and 4th subfields having contents, respectively, 0, ⅓, and ⅔. The remaining subfields will be kept as empty and designated them with "null", as is shown in FIG. 13(a). FIG. 13(b) shows another example. The received ratio signal is 7/3, and thus a common difference is 3/7. Accordingly, seven terms, 0, 3/7, 6/7, 9/7, 12/7, 15/7, and 18/7 are generated. Converting them into mixed fractions, the results are: 0, 3/7, 6/7, $$1\frac{2}{7}, 1\frac{5}{7}, 2\frac{1}{7},$$

and $$2\frac{4}{7}.$$

According the rule, the integer portions includes 0, 1, and 2 will correspond to the 0th, 1st and 2nd field. Each field has three subfields with contents, 0, 3/7, 6/7, respectively, for the 0th field, 2/7, 5/7, null, respectively, for the 1st field, and 1/7, 4/7, null, respectively, for the 2nd field.

Please refer to FIG. 14. It illustrates an image being scrolling and to be scaled down in accordance with an embodiment of the present invention. In FIG. 14(a), the look-up table 90 is generated based on the scaling ratio 3/7 of a received ratio signal. The visual field 3002 having a staring reference coordinate 3000 and a segment 3004 in the visual field 3002 includes sub-segments 92a, 93a, 94a, 95a, 96a, 97a, and 98a corresponding to subfields 92, 93, 94, 95, 96, 97, and 98 in the look-up table 90.

The way of generating the sub-segments 92b, 94b, and 96b in the FIG. 14(b) are similar as above and will be illustrated as follows:

The sub-segments 92b is a combination of picture quality of the sub-segments 92a×(1−0/3) with picture quality of the sub-segments 93a×0/3.

The sub-segments 94b is a combination of picture quality of the sub-segments 94a×(1−1/3) with picture quality of the sub-segments 95a×1/3.

The sub-segments 96b is a combination of picture quality of the sub-segments 96a×(1−2/3) with picture quality of the sub-segments 97×2/3.

Surely, the scaled image contains many segments and each is implemented according to the others fields of the look-up table as above.

At the next time, the image detecting module will detect scrolling direction, e.g., the moving direction of the visual field and figure out a row difference. For instance, the image detecting module detected out the image is downward i.e., the visual field upward by two rows, therefore, the starting reference coordinate 3000 of the look-up table 90 is upward by two units, as shown in FIG. 14(c). At the same time, the segment 3004' has sub-segments 92a', 93a', 94a', 95a', 96a', 97a, and 98a', corresponding to the subfields 92', 93', 94', 95', 96', 97', and 98' in the look-up table.

The way of generating the sub-segments 94b', 96b', and 98b in the FIG. 14(d) are similar as above and will be illustrated as follows:

The sub-segments 94b' is a combination of picture quality of the sub-segments 92a'×(1−0/3) with picture quality of the sub-segments 93a'×0/3.

The sub-segments 96b' is a combination of picture quality of the sub-segments 96a'×(1−1/3) with picture quality of the sub-segments 97a'×1/3.

The sub-segments 98b' is a combination of picture quality of the sub-segments 98a'×(1−2/3) with picture quality of the sub-segments 99a'×2/3.

Surely, the scaled image contains many segments and each is implemented according to the others fields of the look-up table as above. Viewing from visual field is concerned, the combined sub-segment 92b in the previous state shown in FIG. 14(b) are with the same component as the combined sub-segment 94b' in the next state shown in FIG. 14(d). Due to change the position of the starting reference coordinate 3000, both states with their sub-segments generated by the same component. As a result, the viewer will not find out the difference between two states.

Figure 15:
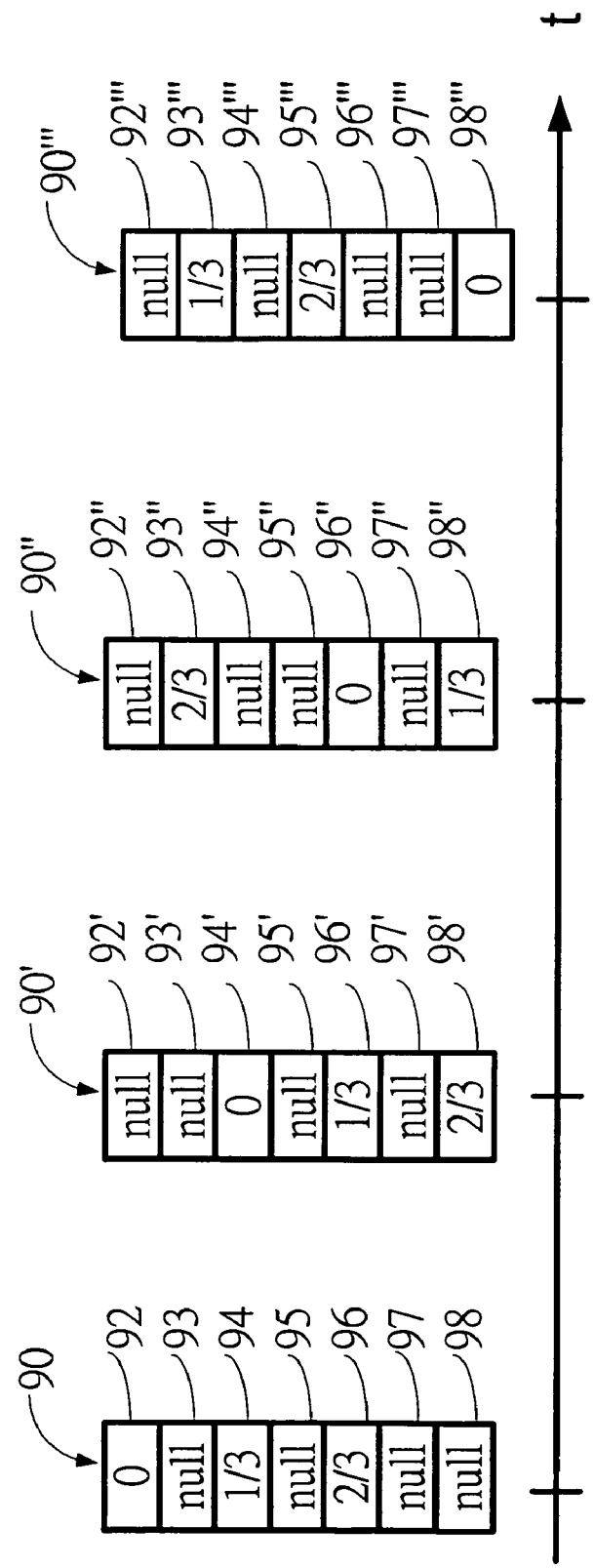
FIG. 15 is a series of schematic diagrams illustrating a look-up table 90 varied with time in accordance with FIG. 14(*a*) to 14(*d*) of a preferred embodiment of the present invention.

In other words, the look-up table 90 is varied with time. Return to above example, the image detecting module detected out the image is downward scrolling i.e., the visual field upward scrolling by two rows. FIG. 15 shows the look-up tables 90, 90', which are, respectively, corresponding to FIG. 14(a) (before the screen is scrolled) and FIG. 14(c) (after the screen is scrolled). In FIG. 15, the look-up tables 90'', 90''', which are, respectively, corresponding to FIG. 14(b) (after the image is scaled down but before the screen scrolled) and FIG. 14(d) (after the image is scaled down and the screen is scrolled.)

Please refer to FIG. 16, which illustrates an image is scrolling and to be scaled up in accordance with another embodiment of the present invention. In FIG. 16(a), the look-up table 100 is generated based on the scaling ratio 73 of a received ratio signal. The visual field 4002 having a staring reference coordinate 4000 and a segment 4004 in the visual field 4002 includes sub-segments 102a, 103a, and 104a corresponding to subfields 102, 103, and 104 in the look-up table 100.

The way of generating the sub-segments 1021b, 1022b, 1023b, 1031b, 1032b, 1041b, and 1042b in the FIG. 16(b) are similar as above and will be illustrated as follows:

The sub-segments 1021b is a combination of picture quality of the sub-segments 102a×(1−0/7) with picture quality of the sub-segments 103a×0/7.

The sub-segments 1022b is a combination of picture quality of the sub-segments 102a×(1−3/7) with picture quality of the sub-segments 103a×3/7.

The sub-segments 1023b is a combination of picture quality of the sub-segments 102a×(1−6/7) with picture quality of the sub-segments 103a×6/7.

The sub-segments 1031b is a combination of picture quality of the sub-segments 103a×(1−2/7) with picture quality of the sub-segments 104a×2/7.

The sub-segments 1032b is a combination of picture quality of the sub-segments 103a×(1−5/7) with picture quality of the sub-segments 104a×5/7.

The sub-segments 1041b is a combination of picture quality of the sub-segments 104a×(1−1/7) with picture quality of the sub-segments 105a×1/7.

The sub-segments 1042b is a combination of picture quality of the sub-segments 104a×(1−4/7) with picture quality of the sub-segments 105a×4/7.

Surely, the scaled image contains many segments and each is implemented according to the others fields of the look-up table as above.

At the next time, the image detecting module detects scrolling direction, e.g., the moving direction of the visual field and figure out a line difference. For instance, the image detecting module detected out the image is downward i.e., the visual field upward by two rows, therefore, the starting reference coordinate 4000 of the look-up table 90 is upward by two units, as shown in FIG. 16(c).

The sub-segments 102a', 103a', and 104a' corresponding to subfields 102', 103', and 104' in the look-up table 100. The way of generating the sub-segments 1021b', 1022b', 1031b', 1032b', 1041b', 1042b', and 1043b' in the FIG. 16(d) are similar as above and will be illustrated as follows:

The sub-segments 1021b' is a combination of picture quality of the sub-segments 102a'×(1−2/7) with picture quality of the sub-segments 103a'×2/7.

The sub-segments 1022b' is a combination of picture quality of the sub-segments 102a'×(1−5/7) with picture quality of the sub-segments 103a'×5/7.

The sub-segments 1031b' is a combination of picture quality of the sub-segments 103a'×(1−1/7) with picture quality of the sub-segments 104a'×1/7.

The sub-segments 1032b' is a combination of picture quality of the sub-segments 103a'×(1−4/7) with picture quality of the sub-segments 104a'×4/7.

The sub-segments 1041b' is a combination of picture quality of the sub-segments 104a'×(1−0/7) with picture quality of the sub-segments 105a'×0/7.

The sub-segments 1042b' is a combination of picture quality of the sub-segments 104a'×(1−3/7) with picture quality of the sub-segments 105a'×3/7.

The sub-segments 1043b' is a combination of picture quality of the sub-segments 104a'×(1−6/7) with picture quality of the sub-segments 105a'×6/7.

Surely, the scaled image contains many segments and each is implemented according to the others fields of the look-up table as above. Viewing from visual field is concerned, the combined sub-segment 1022b in the previous state shown in FIG. 16(*b*) are with the same component as the combined sub-segment 1022b' in the next state shown in FIG. 16(*d*). Due to change the position of the starting reference coordinate 4000, both states with their sub-segments generated by the same component. As a result, the viewer will not find out the difference between two states.

Figure 17:
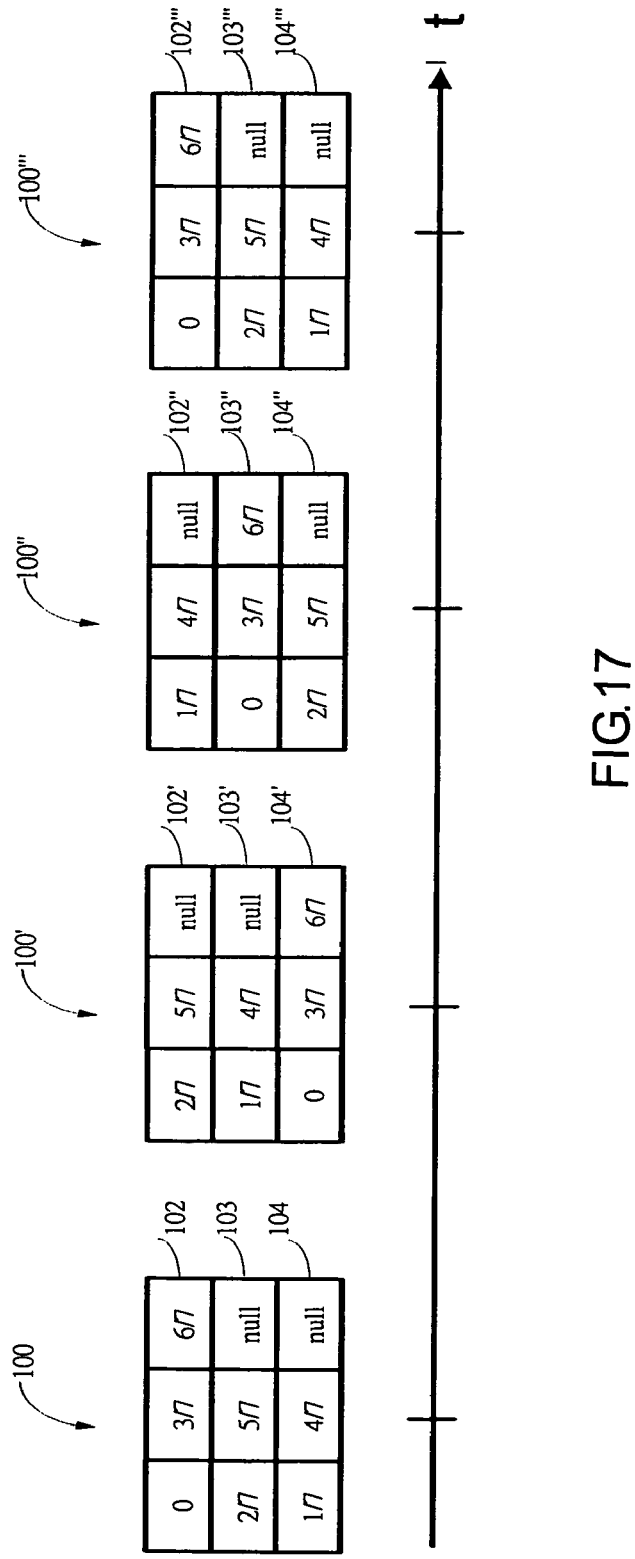
FIG. 17 is a series of schematic diagrams illustrating a look-up table 100 varied with the image scaling and scrolling in accordance with FIG. 16(*a*) to 16(*d*) of another preferred embodiment of the present invention.

In other words, the look-up table 100 is varied with time. Return to above example, the image detecting module detected out the image is downward scrolling i.e., the visual field upward scrolling by two rows. FIG. 17 shows the look-up tables 100', 100' which, are, respectively, corresponding to FIG. 16(*a*) (before the screen is scrolled) and FIG. 16(*c*) (after the screen is scrolled). In FIG. 17, the look-up tables 100'', 100''' which, are, respectively, corresponding to FIG. 16(*b*) (after the image is scaled up but before the screen scrolled) and FIG. 16(*d*) (after the image is scaled up and the screen is scrolled).

Figure 18:
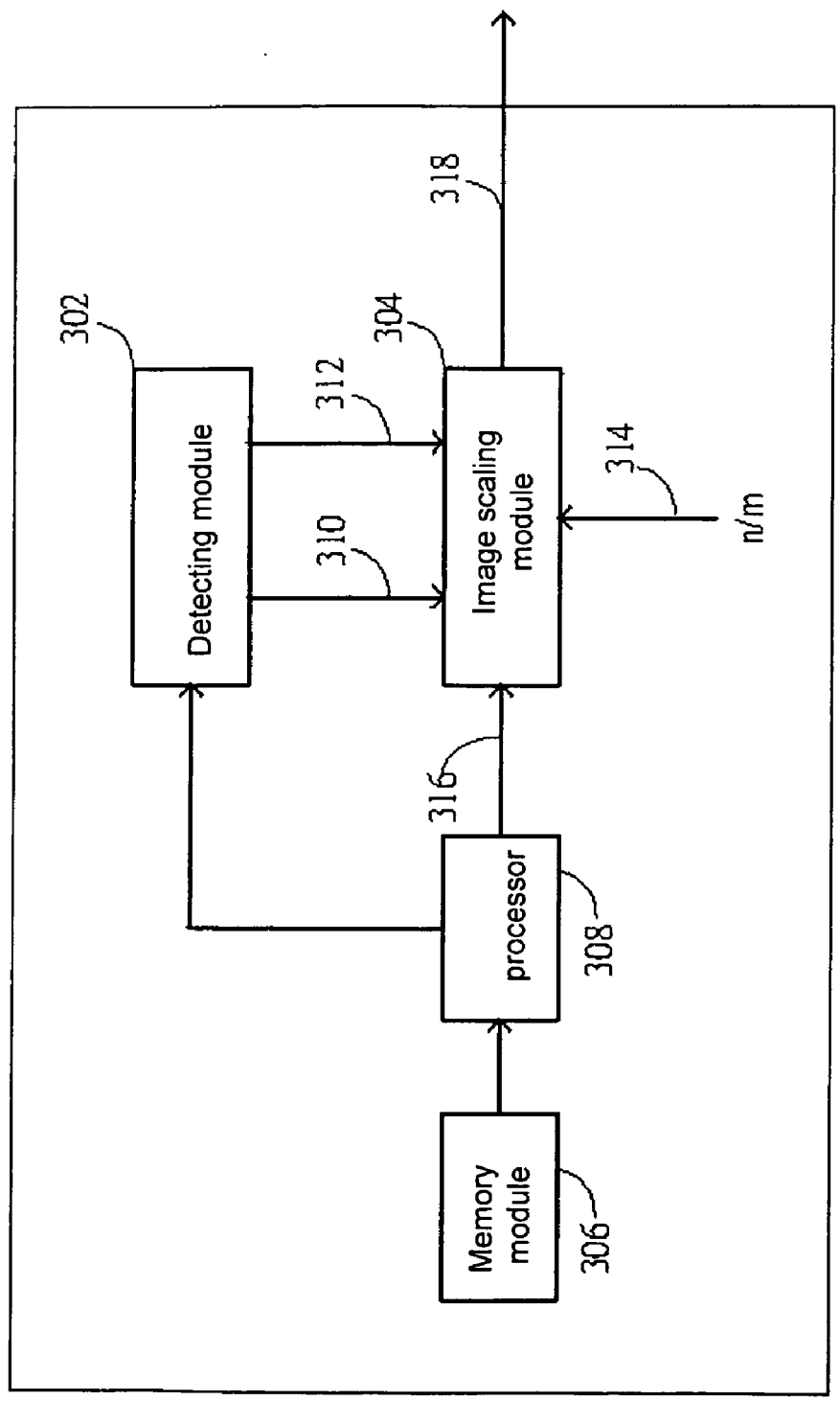
FIG. 18 is a function blocks depicts an apparatus of the image process for improving image quality in accordance with a preferred embodiment of the present invention.

Please refer to FIG. 18, which is to illustrate function blocks of an apparatus for image quality improvement while scrolling and scaling according to the present invention. The apparatus 300 includes an image detecting module 302, an image scaling module 304, a memory module 306, and a processor 308. The memory module 306 is provided for storing data of pictures. The processor 308 is for processing the data in the memory module 306 and for data transfer between the image detecting module 302 and the image scaling module 304. The image detecting module 302 extracts the eigenvalue of the first image and its scrolling direction. Thereafter, the image detecting module 302 outputs a direction signal and a row signal. The image scaling module 304 then scales the first image according to the direction signal, the row signal, and a received ratio signal 314. The image scaling module 304 then outputs a second image 318.

Figure 19:
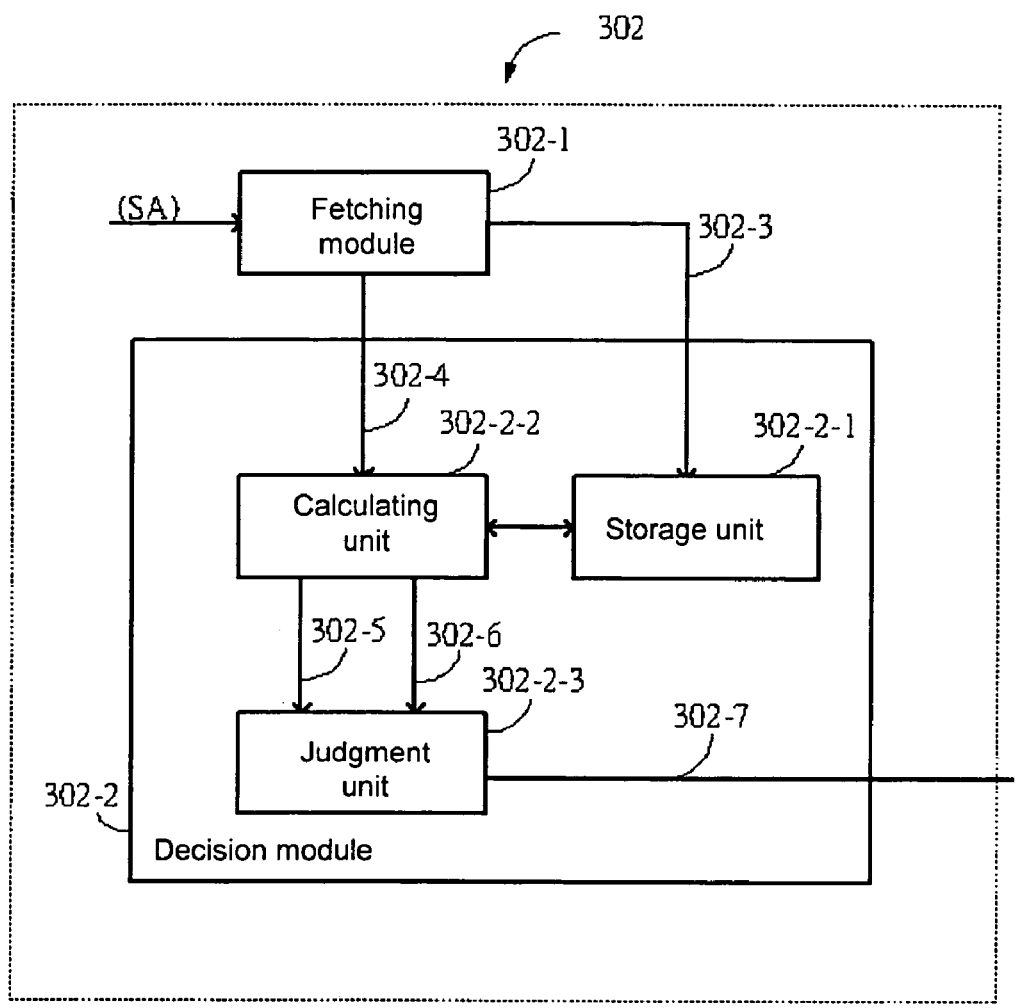
FIG. 19 is a function blocks depicts an image detecting module in accordance with a preferred embodiment of the present invention.

Turning to FIG. 19, which provides a detailed illustration of the image detecting module 302. The image detecting module 302 includes a fetching module 302-1 and a decision module 302-2. The decision module 302-2 is composed a storage unit 302-2-1, a calculating unit 302-2-2 and a judge unit 302-2-3. As is shown, the storage unit 302-2-1 connected both of the fetching module 302-1 and the calculating unit 302-2-2. The calculating unit 302-2-2 connected both of the fetching module 302-1 and the judge unit 302-2-3.

The fetching module 302-1 is provided to fetch a starting address (SA) of a visual field and obtain a line number according to the SA. According to the line number, the fetching module 302-1 outputs a first eigensignal 302-3 to the storage unit 302-2-1, then stores a first eigenvalue according to first eigensignal 302-3. After the visual field is moved, the fetching module 302-1 fetches a starting address (SA) of a visual field again and outputs a second eigensignal 302-4 to the calculating unit 302-2-2 by the same way. The calculating unit 302-2-2 generates a second eigenvalue and then uses it to subtract the first eigenvalue so as to obtains an eigenvalue difference and a absolute value of the eigenvalue difference. Thereafter, the second eigenvalue is stored into storage unit 302-2-1 for reference.

While the visual field is moved again, the fetching module 302-1 fetches its starting address (SA) of a visual field again and outputs a third eigensignal 302-4 to the calculating unit 302-2-2 by the same way. The calculating unit 302-2-2 generates a third eigenvalue and then uses it to subtract the second eigenvalue so as to obtains an eigenvalue difference and a absolute value of the eigenvalue difference. Thereafter, the third eigenvalue is stored into storage unit 302-2-1.

The aforementioned eigenvalue difference and absolute value of the eigenvalue difference obtaining are repeatedly if the visual field is moved. The eigenvalue difference is obtained always by current eigenvalue substracts the previous eigenvalue. Accordingly the scolling direction of the visual field is derived.

On the other hand, the judge unit 302-2-3 generates a decision signal 302-7 according to the eigenvalue difference 302-5 and an absolute value 302-6 of the eigenvalue difference. If the eigenvalue difference 302-5 is larger than zero and if the absolute value of the eigenvalue difference is smaller than an altitude of previous visual field, then a scrolling up decision signal is generated. If the eigenvalue difference 302-5 is smaller than zero and if the absolute value of the eigenvalue difference is smaller than an altitude of current visual field i.e., post the visual field is scrolled, and then a scrolling down decision signal is generated. The decision signal 302-7 includes how many lines will be scrolled.

Figure 20:
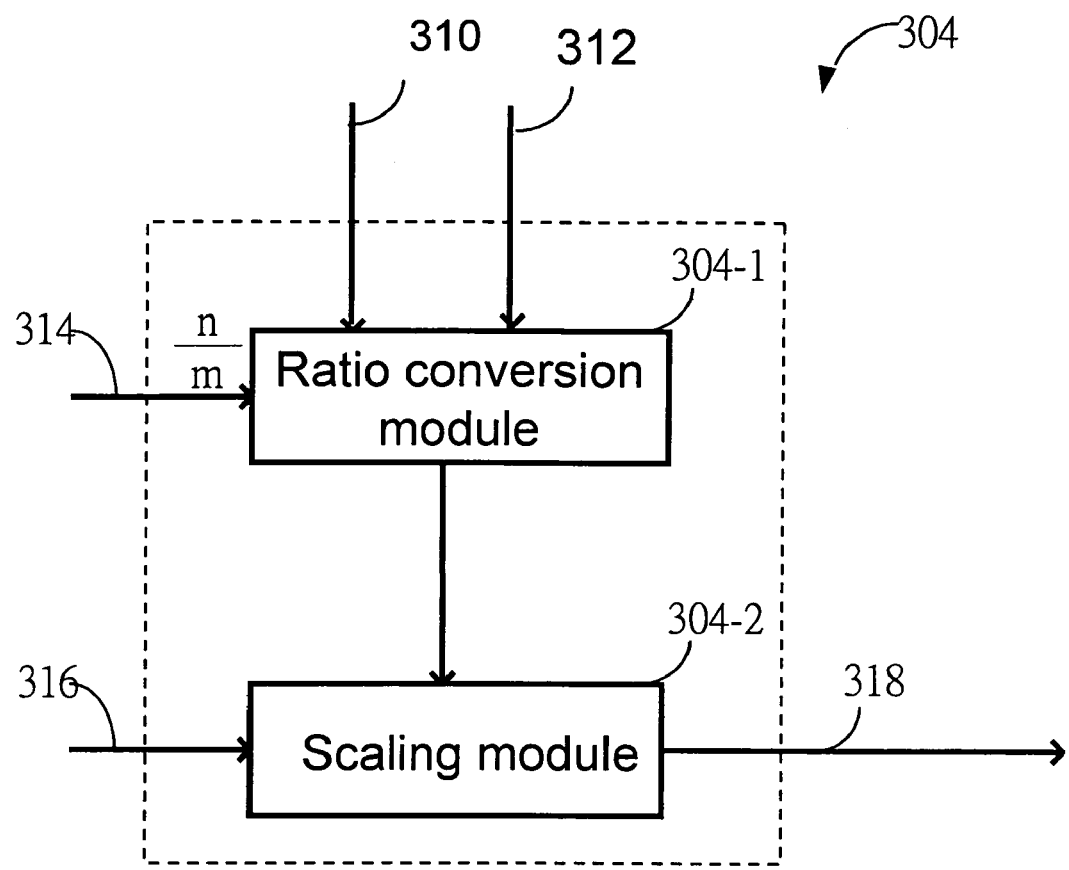
FIG. 20 is a function blocks depicts a scaling module in accordance with a preferred embodiment of the present invention.

Referring to FIG. 20, which is a function block of the scaling module 304 in accordance with the present invention. The scaling module 304 is composed a ratio converting unit 304-1 and a scaling unit 304-2. The ratio converting unit 304-1 is provided to receive a ratio signal 314 thereto generate a look-up table. The ratio converting unit 304-1 also receives the direction signal 310 and the line difference signal 312 so as to update the starting reference point of the look-up table. The scaling unit 304-2 is provided to receive a first image thereto output a second image according to the output signal of the ratio converting unit 304-1. The detailed processes of generating the second image are depicted as above embodiments.

Comparing to the prior art, the image scrolling and scaling apparatus and the method provided by the present invention can overcome the image flicking problem during the screen scrolling and scaling. Furthermore, the variation of the image is smooth during scrolling and scaling. This is because the method utilize the way by changing the reference starting position of the look-up table according to scale the corresponding segments. Using the same look-up table, perform the combination repeatedly on consecutive sub-segments of digital image source 60, the resulted output digital image 61 is the digital image 60 is scaled by 7/3 in vertical direction thereof. Since each sub-segment in the output is the combination obtained from the neighboring sub-segments, no roughness or discontinuities are observed in the output image during image scaling up.

While the preferred embodiments of the invention have been described above, it will be recognized and understood that various modifications can be made in the invention and the appended claims are intended to cover all such modifications which may fall within the spirit and scope of the invention.

What is claimed is:

1. An image data processing apparatus for detecting a scrolling direction of a first image thereto scales said first image, said image data processing apparatus comprising:
   an image detecting module for extracting an eigenvalue of the first image and detecting a scrolling direction thereto outputs a directional signal and a line difference signal, and said image detecting module having a fetching module to fetch a starting address of a visual field and to obtain an eigensignal according to the starting address; and
   a scaling module receiving a ratio signal and coupling with said image detecting module thereto outputs a second image according to the directional signal and a line difference signal and the ratio signal.

2. The image data processing apparatus as in claim 1, wherein said fetching module fetches a starting address of a visual field again while said visual field is scrolled and generates a second eigensignal according to the updated starting address.

3. The image data processing apparatus as in claim 2, wherein said image detecting module further comprises a decision module to generate a decision signal according to the first eigensignal and the second eigensignal, still the decision signal comprises information of scrolled direction of the first image.

4. The image data processing apparatus as in claim 3, wherein said decision module comprises:
   a storage unit for storing a first eigenvalue of the first eigensignal;
   a calculating unit receiving the second eigensignal thereto figures out an eigenvalue difference and a absolute value of said eigenvalue difference, wherein the eigenvalue difference is the second eigenvalue subtract the first eigenvalue; and
   a judge unit generating a judging signal based on the eigenvalue difference and the absolute value of said eigenvalue difference received.

5. The image data processing apparatus as in claim 4, wherein said decision module generating a decision signal obeys following rules:
   said decision signal is an image scrolled up signal if the eigenvalue difference is larger than zero and the absolute value of the eigenvalue difference is smaller than an eigenoffset value and an altitude of previous visual field; and
   said decision signal is an image scrolled down signal while the eigenvalue difference is small than zero and if the absolute value of the eigenvalue difference is smaller than an eigenoffset value and altitude of current visual field;
   wherein the altitude of previous visual field and the current and previous visual field represent, respectively, its height before and after it is scrolled.

6. The image data processing apparatus as in claim 1, wherein said scaling module comprises:
   a ratio converting unit for receiving a ratio signal thereto generate a look-up table; and
   a scaling unit for receiving the first image thereto generate a second image by scaling said first image in accordance with the look-up table.

7. The image data processing apparatus as in claim 6, wherein said scaling module divides the first image into at least one segment, and each segment comprises at least one sub-segment, and the look-up table comprises fields one to one corresponding to each segment, still the field have the sub-fields one to one corresponding to each sub-segment, furthermore, each subfield contains binary code.

8. The image data processing apparatus as in claim 7, wherein said ratio signal provides a scaling ratio n/m, thereto generate a arithmetic progression having (n−1) terms beginning from zero and arithmetic difference m/n, still each subfield is filled in a binary code according to a rule selected from the group consisting of "integrating by omitting decimal fractions smaller than 0.5 and counting all others, including 0,5, as 1", unconditional round off the decimal fraction, and unconditional counting all decimal fractions as 1.

9. The image data processing apparatus as in claim 7, wherein said scaling unit scales the first image is based on contents of the subfields therein, and following rules as follows:
   removing the sub-segment in the first image if the content of a corresponding sub-field is 0;
   keeping the sub-segment in the first image as before if the content of a corresponding sub-field is 1; and
   copying the sub-segment in the first image if the content of a corresponding sub-field is larger than 1, and the number of copying is according to the number in the corresponding sub-field.

10. The image data processing apparatus as in claim 7, wherein the ratio signal provides a scaling ratio n/m, thereto generate a arithmetic progression having (n−1) terms beginning from zero and arithmetic difference m/n still each subfield is filled in a binary code according to following rules:
    converting each term into mixed fraction and having its proper fraction as a weighting ratio and its integral portion corresponding to field number having at least one subfield corresponding to the weighting ratio.

11. The image data processing apparatus as in claim 10, wherein the proper fractions of the mixed fraction are filled into the subfields of the field where the field having field number corresponds to the integral portion of the mixed fraction, which is a term of the arithmetic progression, and those fields and subfields without any proper fraction and integral portion to correspond are designated with "null"; and said scaling unit generates a sub-segment being based on the subfield said sub-segment corresponding and the subfield succeeded.

12. The image data processing apparatus as in claim 11, wherein the order that sub-segments is based on subfields of the field from low field number 0 to the field number (n−1) of the look-up table.

13. The image data processing apparatus as in claim 11, wherein the sib-segment formed is based on the following rules:
    (1) a sub-segment $k^{th}$ is a picture quality of the subfield $k^{th} \times (1-b/a)$ combined with a picture quality of the subfield $(k+1)^{th} \times b/a$, if b/a is a weighting ratio of the subfield $k^{th}$; and
    (2) skip the sub-segment $k^{th}$ if a weighting ratio of the subfield $k^{th}$ is null.

14. An image data processing apparatus for detecting a scrolling direction of a first image thereto scale said first image, said image data processing apparatus comprising:
    an image detecting module for extracting an eigenvalue of the first image and detecting a scrolling direction thereto output a directional signal and a line difference signal;
    a scaling module receiving a ratio signal and coupling with said image detecting module thereto output a second image according to the directional signal and a line difference signal and the ratio signal; and wherein said scaling module generate a look-up table in accordance with the ratio signal and said look-up table having a starting reference point and said starting reference point will be moved down if the directional signal is to make the first image scrolled up, and will be moved up if the directional is to make the first image scrolled down.

15. A method of image data processing for detecting a direction of a first image thereto to scale the first image, said method comprising the steps of:
   extracting an eigenvalue of the first image thereto detecting a scrolling direction and output a directional signal and a line difference signal;
   receiving a ratio signal and accordingly generating a look-up table, wherein the look-up table has a starting reference point and said starting reference point varied with time while scrolling the first image; and
   scaling the first image according to the look-up table, the directional signal and the line difference signal thereto output a second image wherein a processor performs the steps of extracting, receiving and scaling.

16. The method according to claim 15 wherein the starting reference point varied with time is based on the following rules:
   the starting reference point moved down if the directional signal is to make the first image scrolled up; and
   the starting reference point moved up if the directional signal is to make the first image scrolled down; wherein a number of moving units is referring to the line difference signal.

17. An image data processing apparatus for detecting a scrolling direction of a first image thereto scales said first image, said image data processing apparatus comprising:
   an image detecting module for extracting an eigenvalue of the first image and detecting a scrolling direction thereto outputs a directional signal and a line difference signal; and
   a scaling module having a ratio converting unit for receiving a ratio signal and accordingly generating a look-up table and a scaling unit for receiving the first image thereto generate a second image by scaling said first image in accordance with the look-up table and said scaling module coupling with said image detecting module thereto outputs a second image according to the directional signal and a line difference signal and the ratio signal.

* * * * *